(12) United States Patent
Robinson

(10) Patent No.: US 6,585,648 B1
(45) Date of Patent: Jul. 1, 2003

(54) SYSTEM, METHOD AND MACHINE READABLE PROGRAM FOR PERFORMING ULTRASONIC FAT BEAM TRANSMISSION AND MULTILINE RECEIVE IMAGING

(75) Inventor: Brent Stephen Robinson, Kirkland, WA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/295,453

(22) Filed: Nov. 15, 2002

(51) Int. Cl.[7] .............................................. A61B 8/00
(52) U.S. Cl. .................................... 600/437; 600/443
(58) Field of Search .............................. 600/443, 447, 600/444, 449, 453, 455, 437, 456; 367/7, 11; 73/675–676

(56) References Cited

U.S. PATENT DOCUMENTS

| | | | |
|---|---|---|---|
| 4,644,795 A | 2/1987 | Augustine | 73/625 |
| 6,104,673 A | 8/2000 | Cole et al. | 367/138 |
| 6,172,939 B1 | 1/2001 | Cole et al. | 367/138 |
| 6,277,073 B1 | 8/2001 | Bolorforosh et al. | 600/437 |
| 6,350,240 B1 * | 2/2002 | Song et al. | 600/443 |
| 6,514,206 B2 * | 2/2003 | Maxwell et al. | 600/443 |

* cited by examiner

Primary Examiner—Francis J. Jaworski
Assistant Examiner—Maulin Patel
(74) Attorney, Agent, or Firm—John Vodopia

(57) ABSTRACT

A system, method, and machine readable program for performing ultrasonic Fat TX, Multiline RX imaging is provided, wherein the system comprises a transmitter to launch an ultrasound beam toward a target, the beam having a predetermined spatial energy profile in at least one location in the target, the transmitter including a plurality of transducer elements, each transducer element capable of producing a selected waveform having a desired shape; a transmitter processor configured to control the shape of the waveform produced by each transducer element, wherein the spatial energy profile of the beam is controlled by controlling the shape of the waveform produced by each transducer element; a receiver to receive energy from the ultrasound beam directed toward the target from the transmitter; and a receiver processor configured to process the received energy to determine image data representative of the target.

20 Claims, 21 Drawing Sheets

SYSTEM, METHOD AND MACHINE READABLE PROGRAM FOR PERFORMING ULTRASONIC FAT BEAM TRANSMISSION AND MULTILINE RECEIVE IMAGING

BACKGROUND OF THE INVENTION

1. Field of the Invention

The present invention relates to ultrasound imaging systems, and in particular to a system, method and software program for performing ultrasonic imaging by launching a broad beam (Fat TX) having a preselected spatial energy profile at a target and processing energy received from the target to determine image data representative of the target. Particularly, the present invention is directed to a medical ultrasound diagnostic system, method and software program that creates image data of a target using ultrasonic Fat TX and multiline receive (Multiline RX) imaging.

2. Description of Related Art

A variety of methods and systems are known for performing ultrasonic imaging. U.S. Pat. No. 6,277,073 to Bolorforosh et al., U.S. Pat. No. 6,172,939 to Cole et al. U.S. Pat. No. 5,276,654 to Mallart et al. and U.S. Pat. No. 4,644,795 to Augustine, all of which are hereby incorporated by reference in their entirety, describe various methods and devices for performing ultrasonic imaging.

Generally, when performing ultrasonic imaging, a transducer element, typically in the form of a piezoelectric crystal is placed in physical communication with a target (i.e., a patient) to be imaged. When excited by a pulse of electric current, the piezoelectric element emits a burst of ultrasonic waves over a particular frequency spectrum and at a particular intensity. These waves then propagate into the target to image a structure or structures at various depths in the target. As the wave travels through the target to the desired depth, the wave energy is partially absorbed and/or reflected by progressively deeper tissue layers in the target until all of the energy has either been absorbed or reflected. For medical imaging purposes, energy reflected by the target then travels back to the piezoelectric element that launched the wave and/or another piezoelectric element wherein the wave energy causes the piezoelectric element to generate an electrical signal, which is then processed to form image data. Many such cycles can occur within a single second.

Despite the high speed at which data may be acquired with state of the art ultrasonic imaging devices, it is still challenging to image three dimensional (3D) volumes. Ultrasonic sampling in three dimensions in real time requires that the energy reflected from many points within the volume be measured each time the volume is scanned. Given that the rate at which data can be acquired is finite, due to the finite speed of sound, 3D imaging places a strict limitation on the number of transmit/receive cycles available for sampling the region to be imaged. The same is true for high frame rate, large field-of-view two-dimensional (2D) applications. Thus it is greatly desired to find ways to obtain more data in a given period of time.

Generally, medical ultrasonic imaging devices use a plurality of piezoelectric elements arranged in a transducer head, as seen in U.S. Pat. No. 6,172,939 to Cole. Such devices can be used to "steer" transmit (TX) and receive (RX) beams to form an image. This is generally done by "scanning" a beam to sequentially insonify the entire volume to be imaged. Scanning typically involves sequentially launching a plurality of beams at the target across its volume over the course of a single "frame" of scan lines. Each discrete transmit beam is formed by energizing all or a subset of the piezoelectric elements in the transducer head with suitably delayed and weighted pulse waveforms. Each discrete transmit beam is intended to insonify only a small portion of the volume to be imaged. A hundred or so beams need to be launched to create a single 2D frame and many thousand are required to make a 3D frame. Especially in the latter case, this takes a significant amount of time.

One solution to expedite the rate at which data can be acquired involves using a comparatively wide, flat transmit beam as described in U.S. Pat. No. 4,644,795 to Augustine so that multiple receive beams within the flat transmit beam can be usefully employed simultaneously. This technique is generally referred to as "multiline receive." The transmit beamformer of Augustine uses amplitude weighting (based specifically on Sinc functions) to "square up" the transmit beams and insonify a large area. The same waveforms are transmitted on every channel, but the amplitudes differ (or the waveforms may be inverted). However, even at the transmit focal point, using this approach to control the shape of the energy profile across the target has its limitations. Since only amplitude weighting is being used to create the wavefront, the uniformity of insonification of the tissue, and the rejection of targets outside the intended boundaries of the transmit beam is limited.

Multiline RX is a relatively efficient use of transmit cycles because it allows one to obtain multiple receive lines for each transmit event. Likewise, discrete Multiline Transmission ("Multiline TX") can be used to increase the rate at which data can be acquired. The basic premise of Multiline TX is to use parallel transmission paths to transmit discrete multiple beams along adjacent, but spatially distinct, paths as described in U.S. Pat. No. 6,172,939 to Cole et al. Multiple transmit beams are emitted from the device, which are launched into the target. Multiline RX is also employed to form parallel receive beams, as discussed above. B-Mode data, which is indicative of the amplitude of the received echoes, may be obtained and displayed (and/or stored) from the received multiline echoes as known in the art.

These concepts can be expanded to their logical conclusion. The ratio of discrete receive beams can be varied in proportion to the transmit beams to "see" more points in the target. In "2×" Multiline RX, a receive beam is placed on either side of the center of the transmit beam. In "4×" Multiline RX, 2 receive beams are located on either side of the transmit beam, and so on. With a two dimensional "2D" array of piezoelectric elements, one can extend the multiline concept into the elevation direction by receiving beams from above and below as well as both sides of the transmit beam.

Such conventional methods and systems have permitted incremental improvements in ultrasonic imaging capability. However, there still exists a strong need to improve the overall performance of ultrasonic imaging systems. As evident from the related art, conventional methods often require that a plurality of transmit events occur before being able to form a complete image of a target.

Likewise, the flat TX beamformer described in U.S. Pat. No. 4,644,795 is limited in its flexibility due to only varying the relative amplitudes of signals transmitted on each channel without changing the overall shape of the waveform from channel to channel. This limits the degree to which the steepness of the "skirts" of the transmitted beam can be increased. Ideally, a transmitted beam should have a "boxcar" shape instead of a trapezoidal shape.

There thus remains a need to optimize ultrasound imaging techniques in order to obtain as much data as possible and provide as much insight as possible regarding a subject being imaged.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, the invention includes a system for performing ultrasonic fat beam transmission and multiline receive imaging, wherein the system comprises a transmitter configured to launch an ultrasound beam toward a target, wherein the beam has a predetermined spatial energy profile in at least one location in the target. The transmitter further includes a plurality of transducer elements wherein each transducer element is capable of converting a selected electrical waveform having a desired shape to produce an ultrasonic pressure wave. The system also includes a transmitter processor that is configured to generate the electrical waveform and control its shape (and time delay) on each channel connected to a transducer element such that the spatial energy profile of the ultrasound beam is controlled by controlling the shape of the waveform that is produced on each transducer element. The system also includes a receiver that receives energy from the ultrasound beam directed toward the target from the transmitter. Further, a receiver processor is provided that is configured to process the received energy to determine image data representative of the target.

Preferably, a system is provided wherein the spatial energy profile of the ultrasound beam is substantially flat at the location in the target and the receiver can be formed from at least a portion of the plurality of transducer elements as the transmitter and the final shape of the waveform launched from any transducer element is determined by combining at least two preselected waveforms. For example, more transducer elements can be used by a receive beam than by a transmit beam. Likewise, the transmitter and receiver can be formed of entirely different transducer elements, or using only some of the same transducer elements.

In another aspect of the invention a system is provided wherein the received energy is received in the form of at least one received beam having an outer periphery and the transmitter is further configured to send ultrasound guard beams on the outer periphery of the at least one received beam.

In yet another aspect of the invention a system is provided wherein the transducer elements are arranged in a substantially two-dimensional array and wherein the instantaneous frequency (and/or amplitude) of a waveform transmitted from a first transducer element can be different from the instantaneous frequency of a waveform transmitted from a second transducer element. The system allows for time delays on different channels to permit steering and focusing of the transmit and receive beams.

The invention also includes a method for performing ultrasonic Fat TX, Multiline RX imaging comprising the step of selecting waveforms to transmit on a plurality of transducer elements toward a target, wherein each transducer element is capable of producing a selected waveform having a desired shape and said transducer elements comprise a transmitter. The method also comprises transmitting an ultrasound beam from the transmitter, wherein the beam has a predetermined spatial energy profile in at least one location in the target. In this method, the spatial energy profile of the beam is controlled by controlling the shape of the waveform produced by each transducer element. The method also comprises receiving energy from the ultrasound beam directed toward the target from the transmitter and processing the received energy to determine image data representative of the target.

Preferably, a method is provided wherein the spatial energy profile of the ultrasound beam is substantially flat at the location in the target and the receiver is formed from the same plurality of transducer elements as the transmitter and the final shape of the waveform launched from any transducer element is determined by combining at least two preselected waveforms.

In another aspect of the invention a method is provided for forming an ultrasound beam wherein received energy is received in the form of at least one received beam having an outer periphery and the transmitter is further configured to send ultrasound guard beams on the outer periphery of the at least one received beam.

The invention also includes a machine readable program containing instructions for controlling a system to perform ultrasonic Fat TX, Multiline RX imaging, wherein the system has a transmitter, a transmitter processor, a receiver and a receiver processor, and the program comprises means for controlling transmission of an ultrasound beam from a plurality of transducer elements toward a target. The transmitted beam has a predetermined spatial energy profile in at least one location in the target wherein each transducer element is capable of producing a selected waveform having a desired shape, and the spatial energy profile of the beam is controlled by controlling the shape of the waveform produced by each transducer element.

Preferably, a machine readable program is provided containing instructions for controlling a system to perform ultrasonic Fat TX, Multiline RX imaging wherein the spatial energy profile of the ultrasound beam is substantially flat at least one location in a target and the final shape of the waveform launched from any transducer element is determined by combining at least two preselected waveforms.

In another aspect of the invention a machine readable program is provided wherein the received energy is received in the form of at least one received beam having an outer periphery and the transmitter is further configured to send ultrasound guard beams on the outer periphery of the at least one received beam.

In yet another aspect of the invention a machine readable program is provided wherein the instantaneous frequency of a waveform transmitted from a first transducer element can be different from the instantaneous frequency of a waveform transmitted from a second transducer element.

It is to be understood that both the foregoing general description and the following detailed description are exemplary and are intended to provide further explanation of the invention claimed.

The accompanying drawings and flow diagram, which are incorporated in and constitute part of this specification, are included to illustrate and provide a further understanding of the system, method and machine readable program of the invention. Together with the description, the drawings and flow diagram serve to explain the principles of the invention.

DETAILED DESCRIPTION OF THE PREFERRED EMBODIMENT

Figure 1:
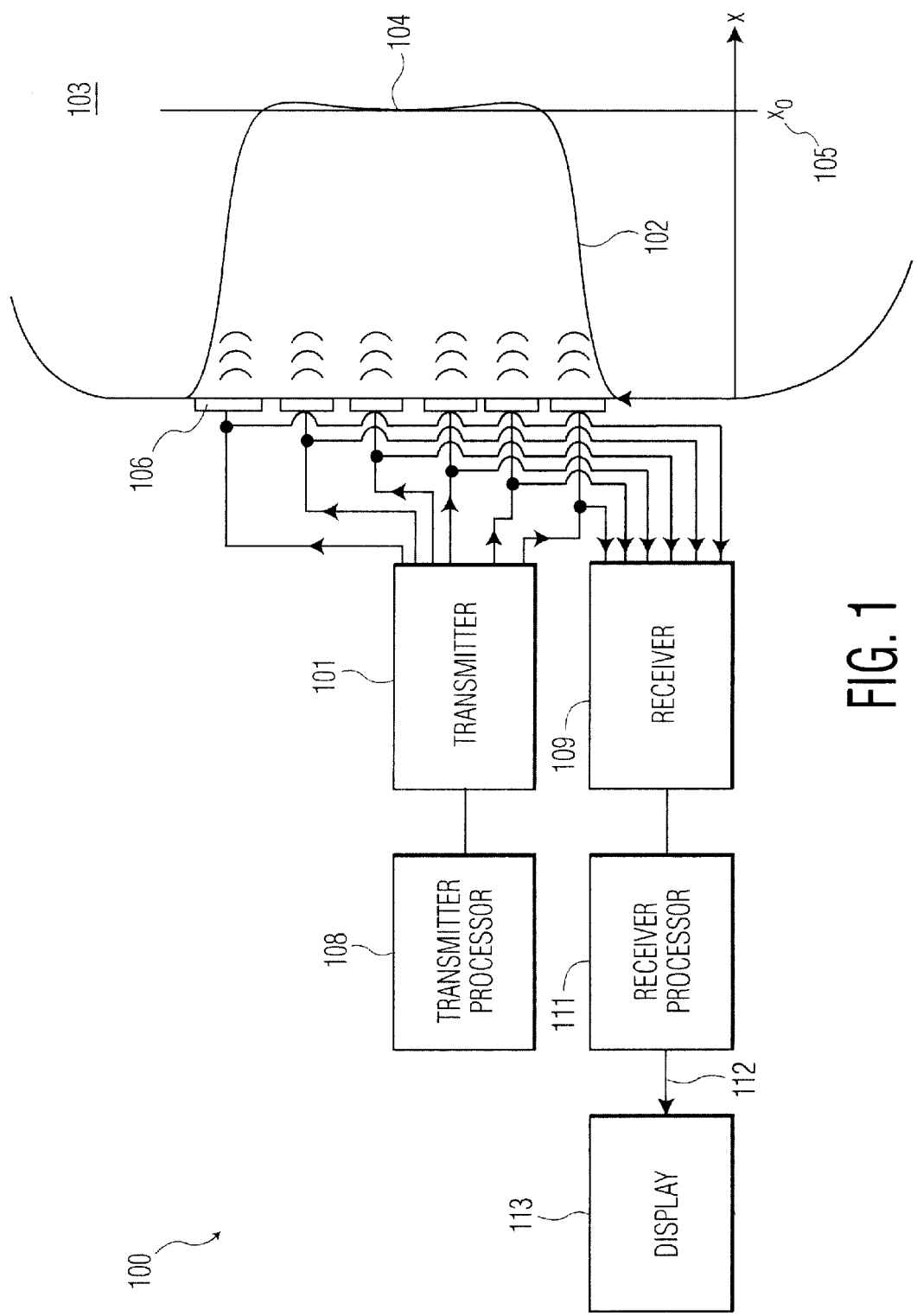
FIG. 1 is a schematic representation of the system, method and machine readable program for performing ultrasonic fat beam transmission and multiline receive imaging in accordance with the invention.

Reference will now be made in detail to the present preferred embodiments of the invention, an example of which is illustrated in the accompanying drawings and flow diagram. The method and corresponding steps of the invention will be described in conjunction with the detailed description of the system.

The methods, systems and machine readable programs presented herein may be used for determining the internal structures of a target object. The present invention is particularly suited for medical ultrasound diagnostic imaging. For purpose of explanation and illustration, and not limitation, an exemplary embodiment of the system in accordance with the invention is shown in FIG. 1 and is designated generally by reference character 100.

Figure 2:
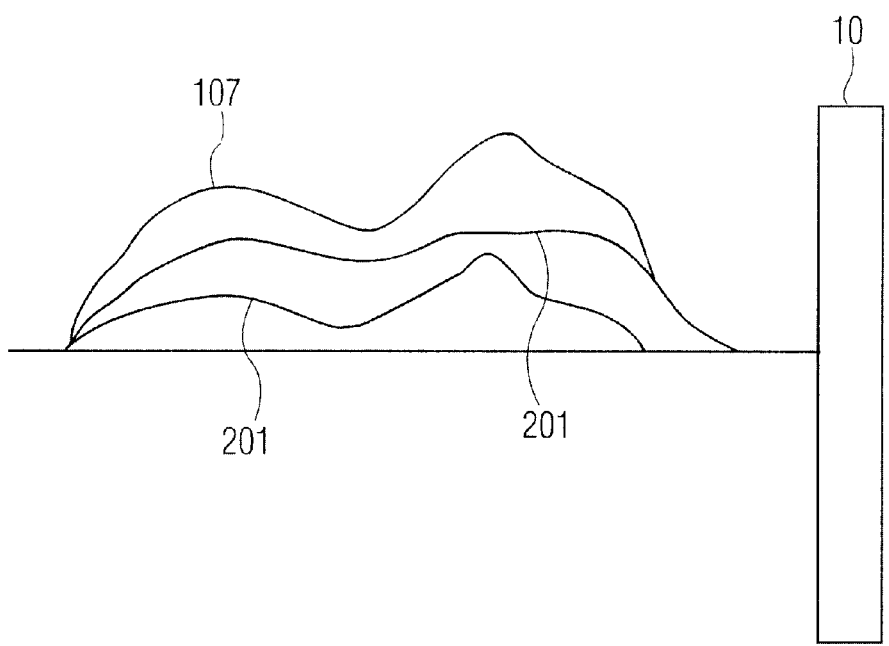
FIG. 2 is a schematic representation of combining at least two component waveforms in accordance with a preferred embodiment of the invention.

As shown in FIG. 1, the system 100 generally includes a transmitter 101 to launch an ultrasound beam 102 toward a target area 103, the beam 102 having a predetermined spatial energy profile 104 in at least one location 105 in the target. The transmitter includes a plurality of transducer elements 106. Particularly, 105 is represented as a distance x0 from the transducer elements 106. Referring to FIG. 2, each transducer element is capable of producing a selected composite waveform having a desired shape 107. The system also includes a transmitter processor 108 configured to control the shape of the composite waveform 107 produced by each transducer element 106, wherein the spatial energy profile 104 of the beam is collectively controlled by controlling the shape of the composite waveform 107 produced by each transducer element 106. The system also includes a receiver 109 to receive ultrasonic energy reflected by the target 103. Preferably, transducer elements 106 are used to both send ultrasonic signals into target 103, and receive received energy.

Additionally, a receiver processor 111 is provided and configured to process the received energy to determine image data 112 representative of the target 103 to be displayed on display/storage device 113.

Specifically, and in accordance with the present invention, each component of the system can be standard medical ultrasonic diagnostic equipment having sufficient digital memory to store the composite waveforms 107 for each channel and sufficient power to launch waveforms 107 on each channel simultaneously to form beam 102 modified to practice the present invention. The waveforms 107 for different elements 106 preferably have different shapes.

Preferably, the spatial energy profile 104 of the fat beam will be substantially flat. A beam with a flat energy profile across a target volume of interest ensures substantially uniform insonification (i.e., energization with ultrasonic energy) of the target volume. Relatively uniform insonification of a target volume results in a signal of received energy of substantially equal amplitude for tissue having similar physical characteristics (density, elasticity, etc.) Having the insonification of the target at a given depth $x_0$ from the transducer elements being substantially uniform will also help to minimize artifacts on a resulting ultrasound image on a display panel.

Given a desired shape of the spatial energy profile 104, it will be possible for the system to construct a composite ultrasound beam from a plurality of preselected waveforms launched on each element 106 of the transmitter 101.

Figure 3:
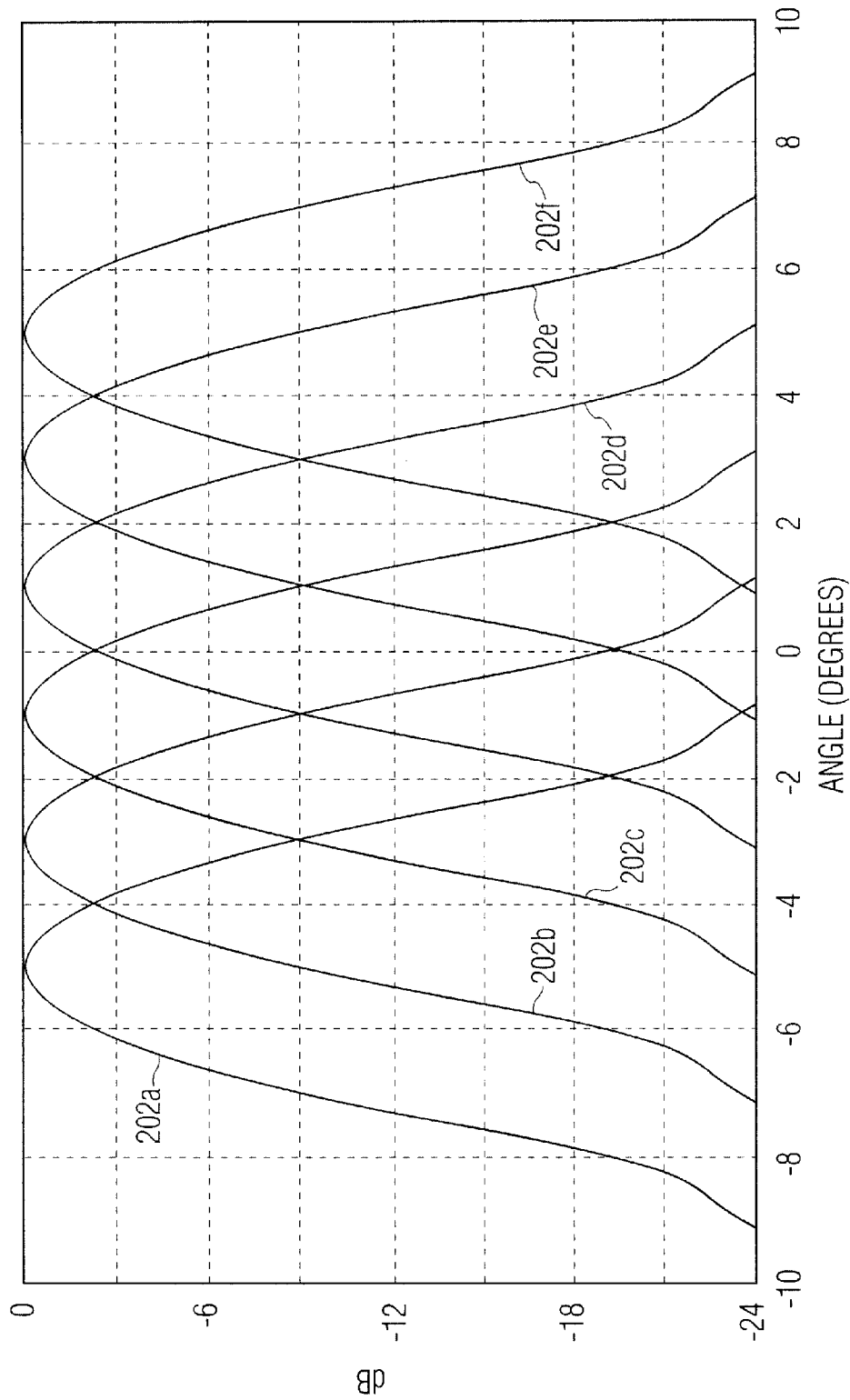
FIG. 3 is a schematic representation of six discrete transmit beams separated 2· from one another in a traditional multiline transmit arrangement.
Figure 4:
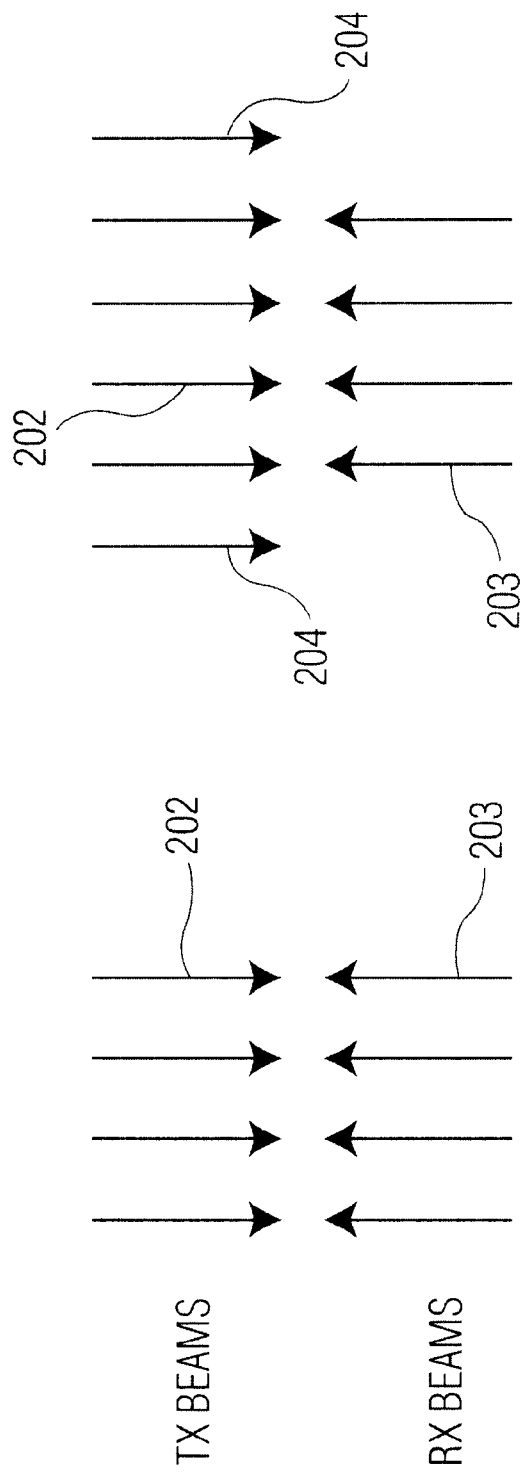
FIG. 4a is a schematic representation of a situation wherein four transmit beam directions are aligned with four receive beam directions.
FIG. 4b is a schematic representation of a situation wherein six transmit beam directions (4×multiline+2 guard beams) are aligned with four receive beam directions.

Preferably, the composite waveforms 107 on each channel will be a superposition of at least two different component waveforms 201 that correspond to a scenario of transmitting multiple, discrete ultrasound beams 202 that insonify substantially all of a region over a period of time, as opposed to all at once, as with the present invention. A diagram representing this familiar situation is depicted in FIG. 3. As seen in FIG. 3, each of a plurality of transmit beams 202 are transmitted along evenly spaced transmit beam directions (or angles). These transmit beams can be aligned with a plurality of receive beams 203 oriented along evenly spaced receive beam directions, as illustrated in FIG. 4. Using this method, over a period of time it is possible to insonify an entire volume of interest. In practice, it may also be advantageous to employ non-uniform beam spacing in order to match different spatial resolutions at different,regions of the image.

However, by breaking down, or decomposing, each of the discrete beams 202 into their component waveforms 201 launched from each element 106, adding those component waveforms 201 to form composite waveforms 107 on each channel, and launching composite waveforms 107 simultaneously to form ultrasonic beam 102, it is possible to launch a single beam 102 that will insonify the same region of interest but do so in a fraction of the time. This permits a given amount of image data to be gathered in less time than in the devices in the prior art that use consecutive discrete transmit beams 202.

Additionally, the present invention provides a distinct advantage over the Fat TX beam described in U.S. Pat. No. 4,644,795 to Augustine. The optimal amplitude weighting pattern described in Augustine is frequency dependent, in that the fat beam is designed to operate at a single frequency. However, when a pulse is launched from the Augustine system in practice, a broad spectrum of frequencies is actually used. The amplitude weighting of Augustine does not "fit" those other frequencies within the spectrum. In contrast, in accordance with the present invention, use of a broad spectrum of frequencies is contemplated, and thus does not suffer from the shortcomings of Augustine.

Preferably, transmitter processor 108 and transmitter 101 will have sufficient memory and power to store and launch the precomputed waveforms. It is particularly important to ensure that there will be sufficient digital memory to store the data necessary to construct the waveforms launched from the periphery of the array as these tend to be more temporally spread out.

Additionally, since component waveforms 201 can be pre-selected, it is possible to accurately simulate the spatial energy profile 104 of a beam 102 when implementing the invention. Therefore, based on known component waveforms 201, it is possible to predict the shapes of composite waveforms 107 and what the spatial energy profile 104 of ultrasonic beam 102 will look like, thereby permitting the spatial energy profile 104 of the beam 102 to be predetermined. A fat beam can be designed and simulated in this manner, as demonstrated in Example I below.

In accordance with another embodiment of the invention, a method, machine readable program and system is provided for performing ultrasonic Fat TX, Multiline RX ultrasonic imaging, wherein the spatial energy profile of an ultrasound beam is substantially flat at a desired location in the target. Further, received energy is received in the form of at least one received beam, wherein the received beam has an outer periphery, and ultrasound guard beams are transmitted on the outer periphery of the received beam by the transmitter.

Launching guard beams on the outer periphery of the received beam helps prevent "jailbar" ultrasonic artifacts, which appear as dark bands on a display screen. Such artifacts occur when the displayed image is comprised of lines that have different spatial responses. Ultrasonic images made using higher order multiline (3×, 4×, . . . ) can be thought of as consisting of "central lines," or receive beams located toward the center of the insonified region of interest. These lines have discrete transmit beams launched on either side of the receive beam, so that the spatial angles of each of those central receive beams are substantially evenly insonified.

However, receive beams in prior art devices that view tissue toward the periphery of an insonified target volume only have ultrasonic beams launched on the inner side of the outermost receive beam. As a result, part of the volume viewed by the outermost beam is less insonified in comparison to a similarly sized volume viewed toward the center of the region of interest by a central beam. The end result is darkened lines, or "jail-bar" artifacts proximal to the borders of the viewed volume.

Referring again to FIG. 4, by transmitting guard beams 204 on the outside of the outermost receive beams, this artifact may be substantially reduced since all of the receive beams are viewing tissue insonified to largely the same extent. The result is an improved image. Having an image without these artifacts is clearly beneficial since it can help decrease distractive patterns on the screen, thereby reducing operator error. While just one extra pair of transmitted lines will significantly reduce jail-bar artifacts in high-order multiline, more lines can be added if necessary.

EXAMPLE I

In practice, in non-multiline prior art devices, each discrete transmitted beam is actually composed of a superposition of component waveforms from many or all of the elements in an array of transducer elements. For example, six such discrete transmitted beams 202($a$–$f$) are depicted in FIG. 3. In prior art devices, each of these beams is launched, one at a time, from a transducer array. Only a single beam 202 is launched for each scan-line. As a result, the entire volume of interest is insonified, and signals are received and processed to form an image on a display screen.

By using the novel invention described herein, it is possible to combine these six discrete transmitted beams and launch them as a single transmit event. By launching these beams simultaneously, transmission can be done in a mere fraction of the time as compared to devices and methods of the prior art.

In accordance with the invention, the Fat TX beam is formed in the following manner. In this six beam example, it is desired to obtain the benefit of launching six discrete beams, but doing so in a single transmit event to save time, thereby allowing the frame rate to be increased. To do so, it is assumed that the component waveforms 201 needed to be launched on each channel to form all discrete beams 202 ($a$–$f$) are known.

If the component waveforms for each discrete beam 202 are known, then the component waveforms 201 for each discrete beam that would be carried on each channel can be added, and launched in a single transmit event. It is understood that each individual transmission channel corresponds to a single transducer element 106.

FIGS. 5–20 demonstrate the effect of adding waveforms to form composite waveforms and flat beams for a single transducer element 106 located towards the periphery of the transmit aperture of a transducer array.

FIGS. 5–10 show the individual component waveforms 201(a–f) launched from transmitter elements 106 at the outer edge of a transmit aperture for each of the six transmit beams 202(a–f) shown in FIG. 3. These component waveforms 201(a–f) would each be launched individually during the six transmits needed to form six individual transmit beams 202(a–f). The waveforms have identical shapes (in the sense that their normalized cross-correlations are unity for some lag) and are merely relatively advanced or delayed in time so that the beams 202(a–f) are steered accordingly.

In accordance with the present invention, at least two of these individual component waveforms can be added and launched, in combination with similar added waveforms launched from other elements in the array to form a Fat TX transmit beam. As the number of combined discrete beams increases, progressively larger areas of a target can become insonified.

Figure 5:
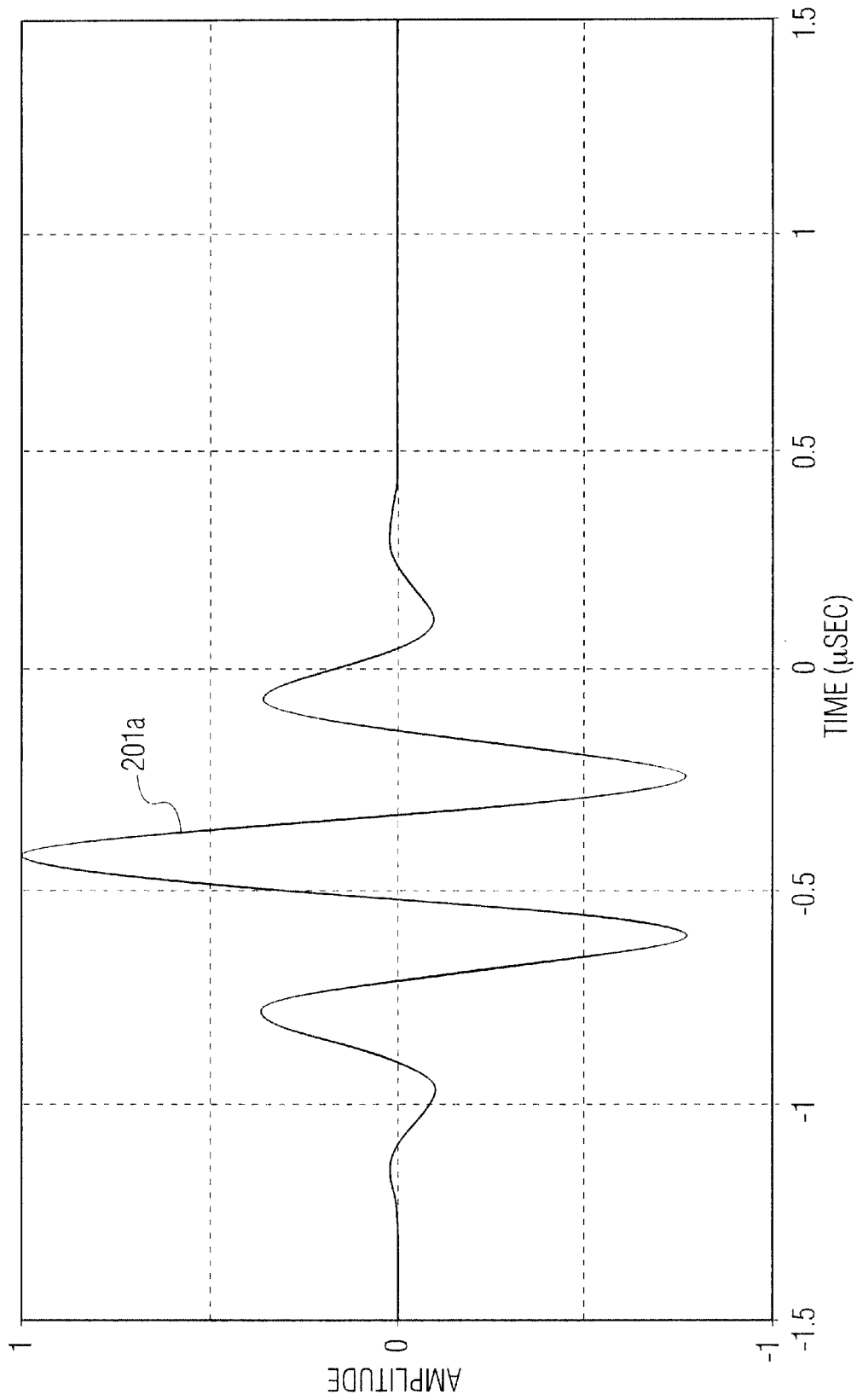
FIG. 5 is a schematic representation of an individual component waveform 201a launched from a transmitter element at the outer edge of a transducer array for transmit beam 202a shown in FIG. 3.
Figure 6:
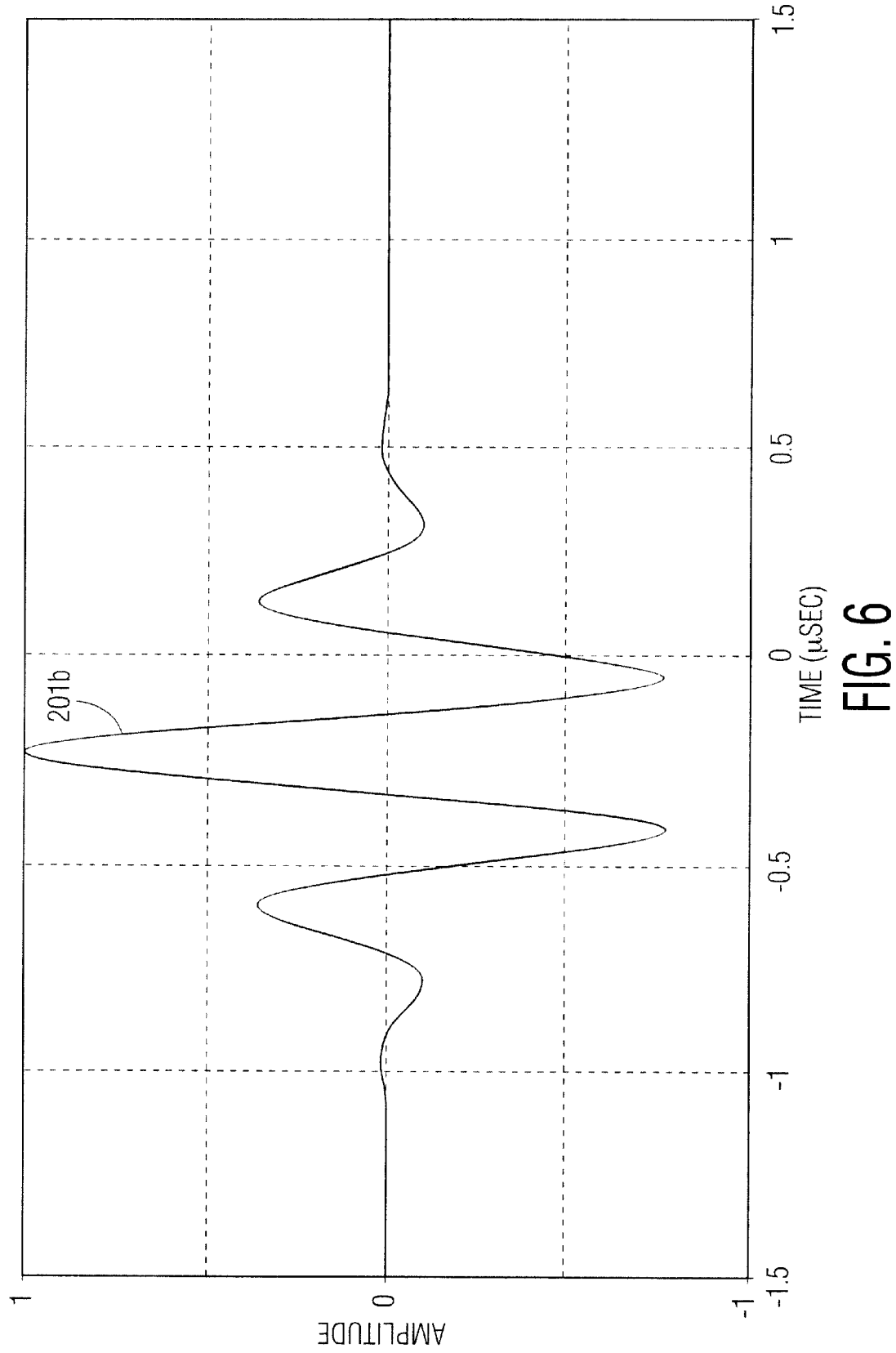
FIG. 6 is a schematic representation of an individual component waveform 201b launched from a transmitter element at the outer edge of a transducer array for transmit beam 202b shown in FIG. 3.
Figure 7:
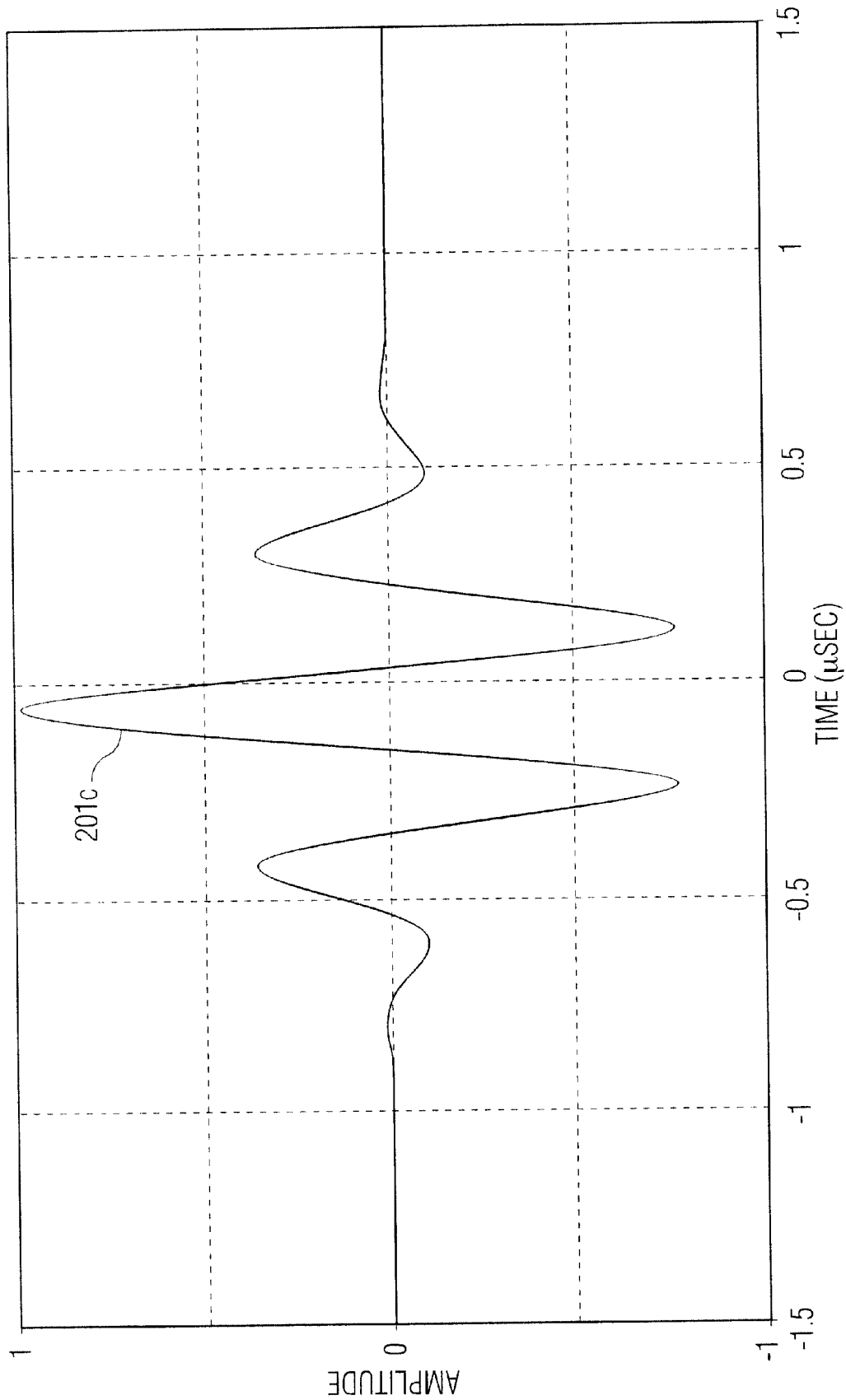
FIG. 7 is a schematic representation of an individual component waveform 201c launched from a transmitter element at the outer edge of a transducer array for transmit beam 202c shown in FIG. 3.
Figure 8:
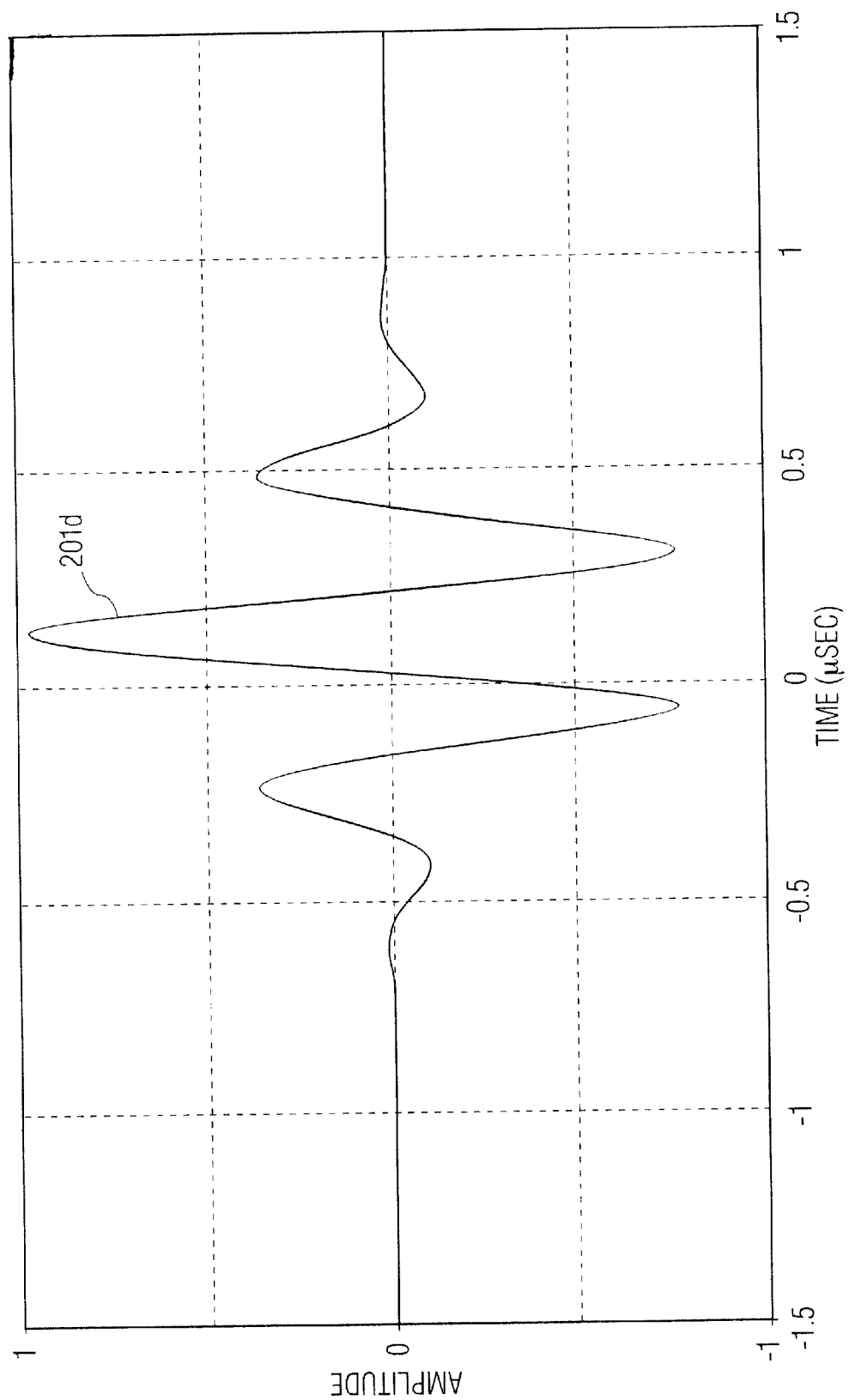
FIG. 8 is a schematic representation of an individual component waveform 201d launched from a transmitter element at the outer edge of a transducer array for transmit beam 202d shown in FIG. 3.
Figure 9:
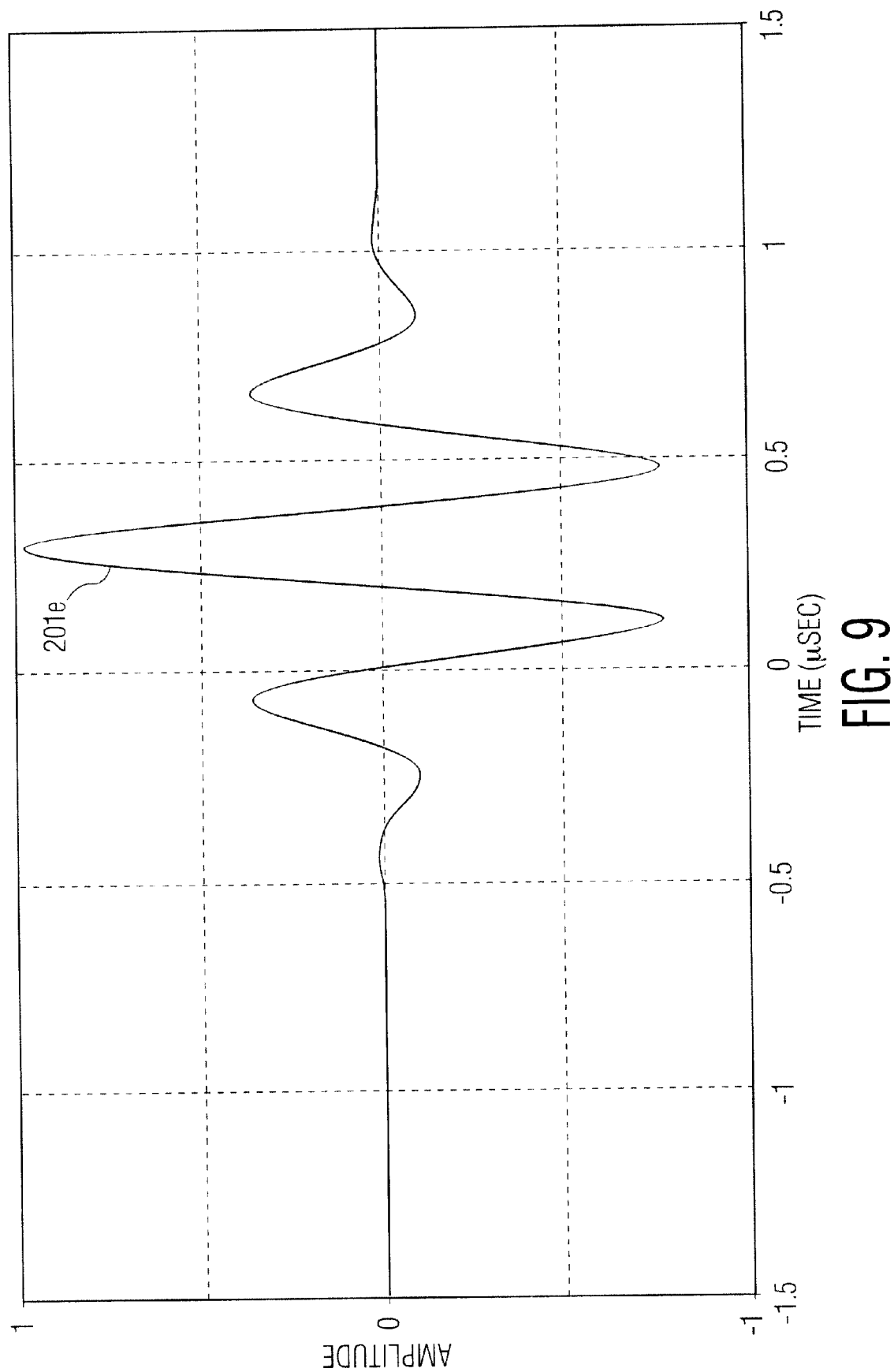
FIG. 9 is a schematic representation of an individual component waveform 201e launched from a transmitter element at the outer edge of a transducer array for transmit beam 202e shown in FIG. 3.
Figure 10:
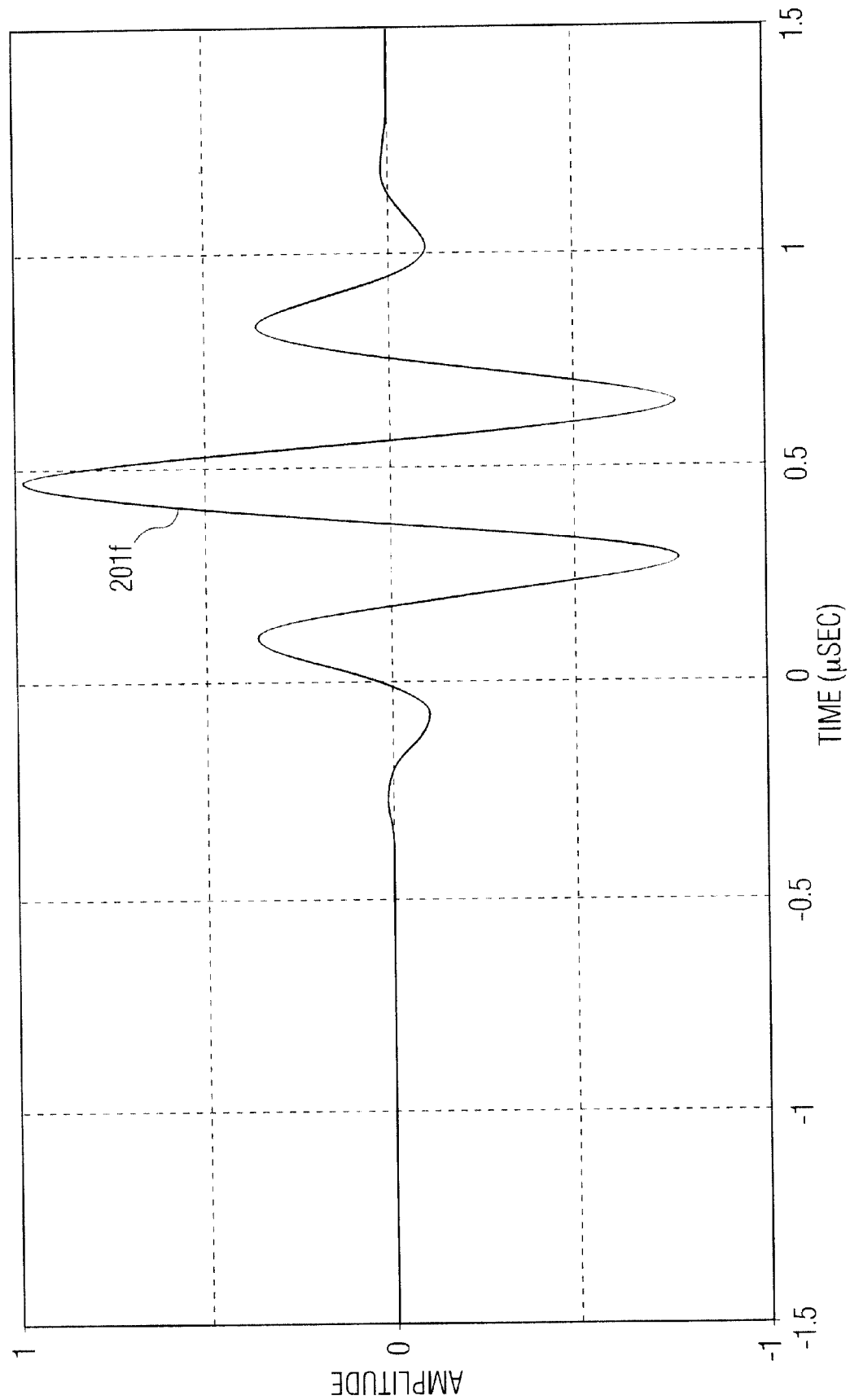
FIG. 10 is a schematic representation of an individual component waveform 201f launched from a transmitter element at the outer edge of a transducer array for transmit beam 202f shown in FIG. 3.
Figure 11:
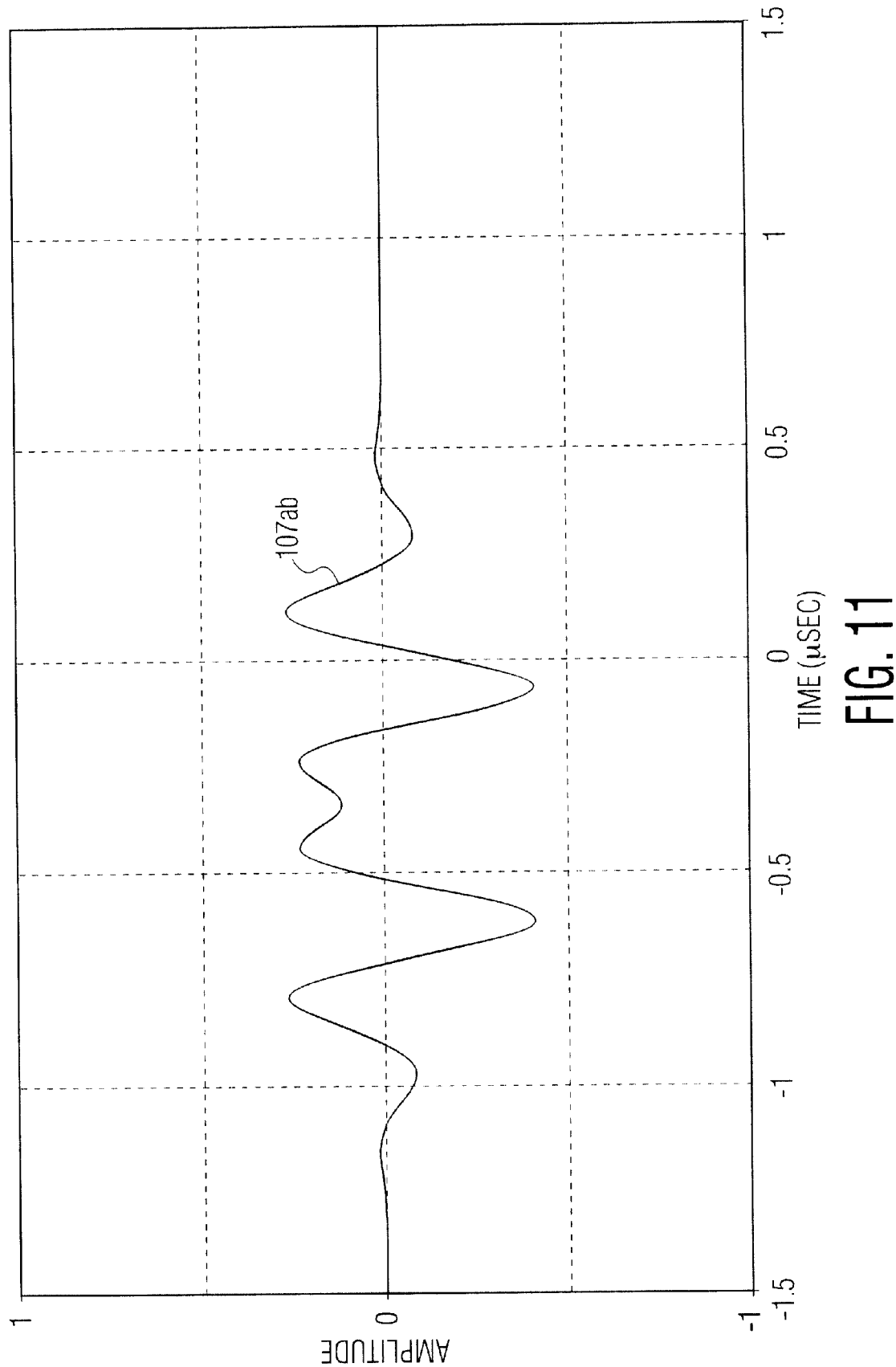
FIG. 11 discloses the shape of the waveform 107ab that would result by combining waveforms 201a and 201b in FIGS. 5 and 6.
Figure 12:
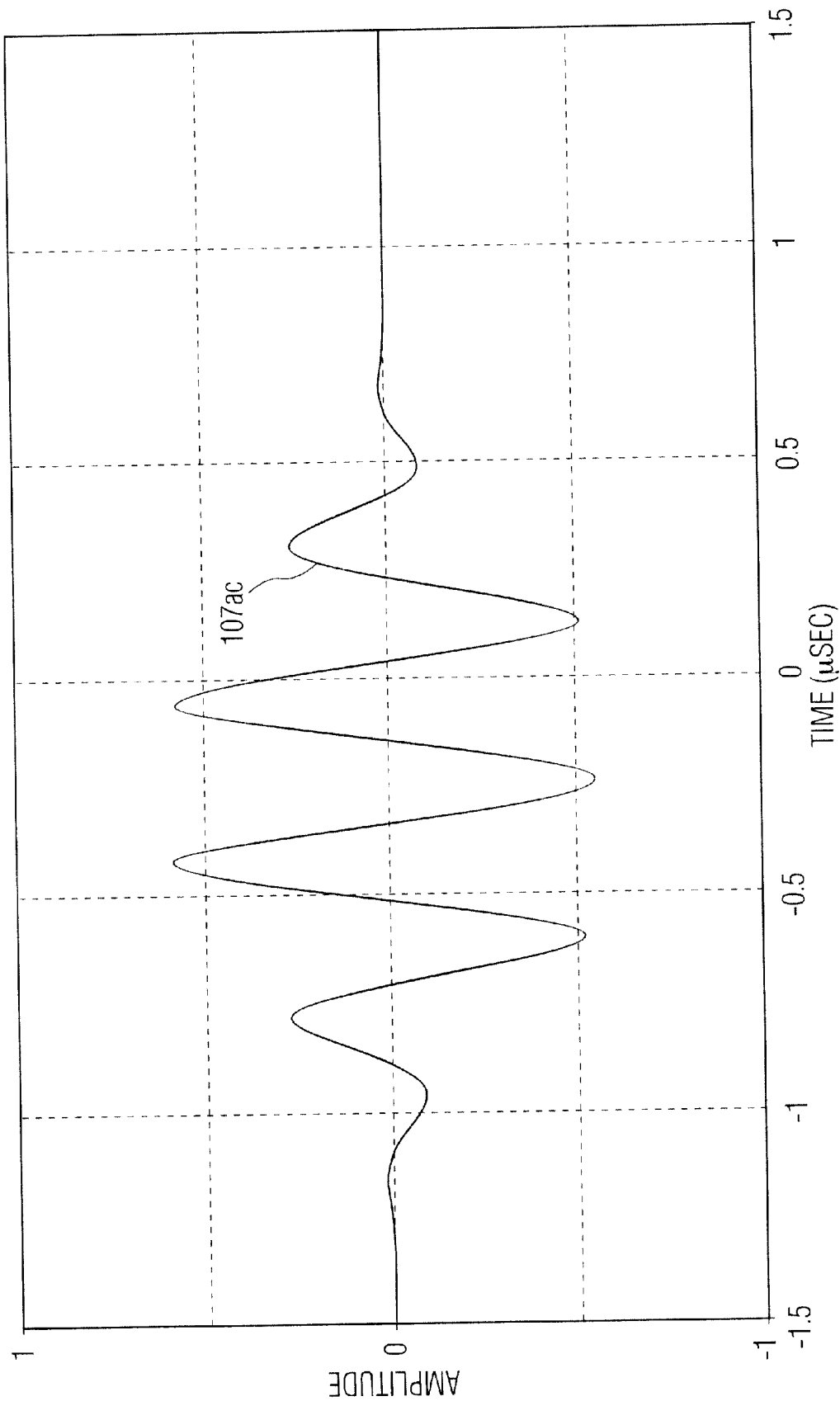
FIG. 12 discloses the shape of composite waveform 107ac that would result by combining waveforms 201a, 201b and 201c in FIGS. 5, 6 and 7.
Figure 13:
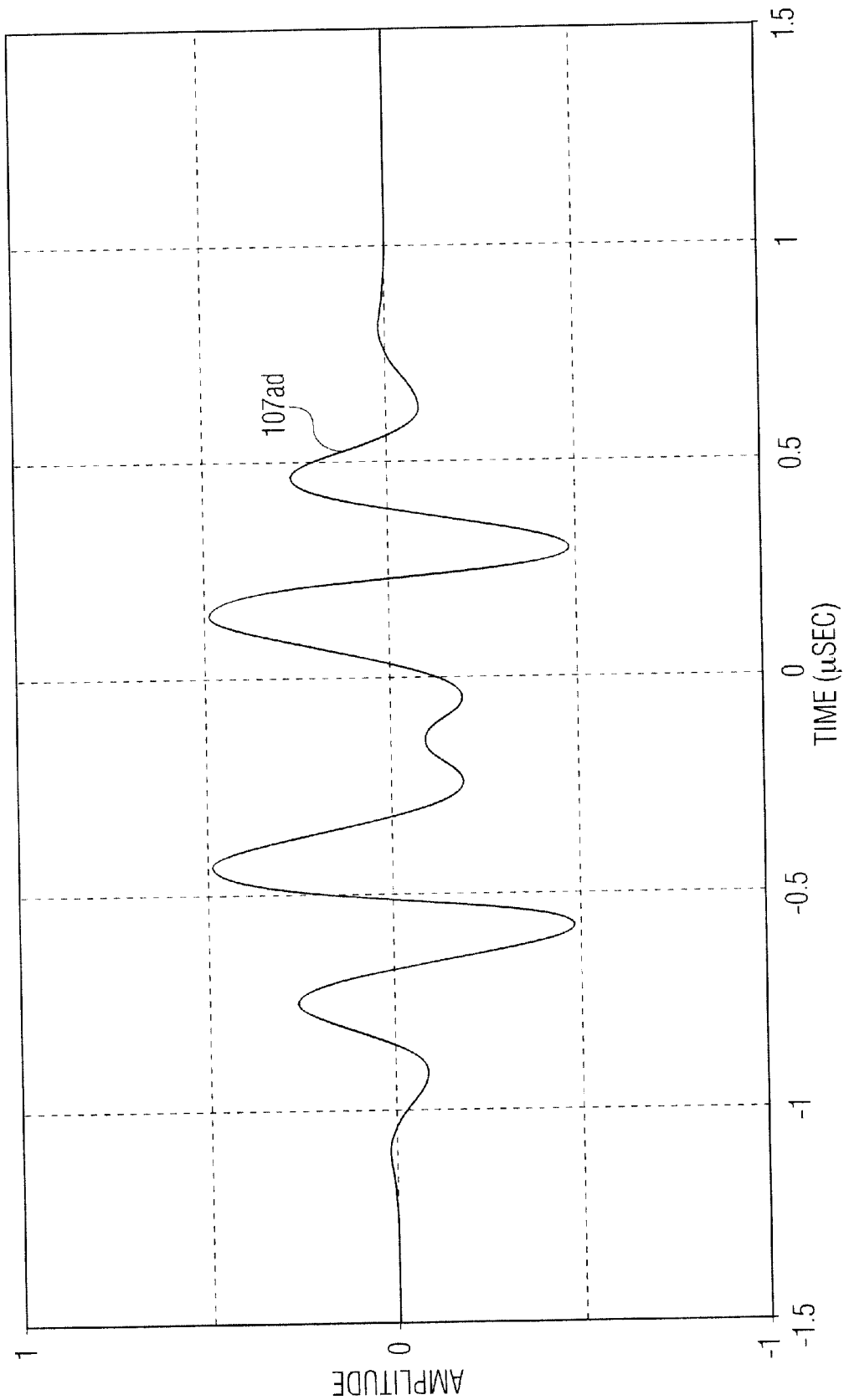
FIG. 13 discloses the shape of composite waveform 107ad that would result by combining waveforms 201a, 201b, 201c and 201d in FIGS. 5, 6, 7 and 8.
Figure 14:
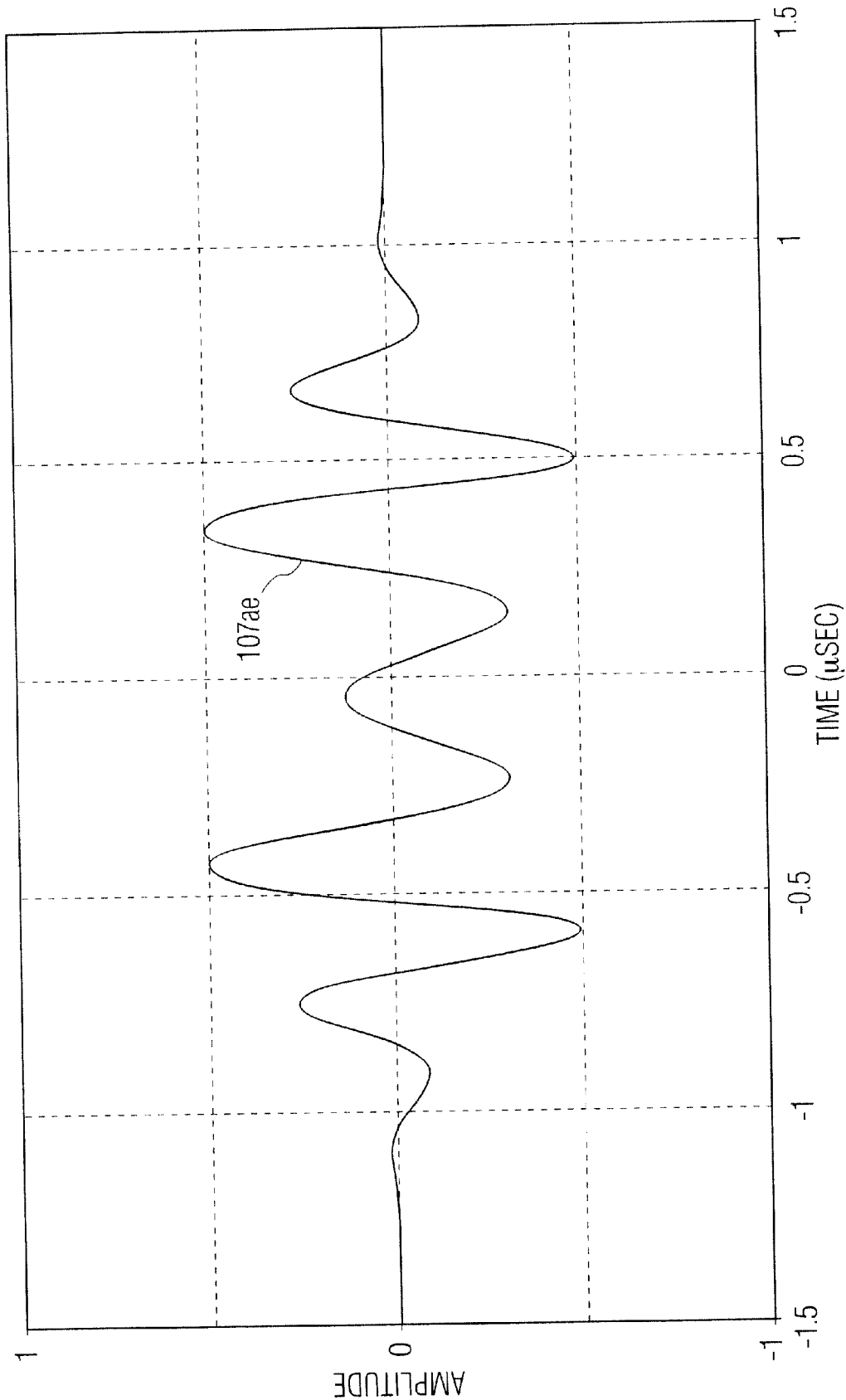
FIG. 14 discloses the shape of composite waveform 107ae that would result by combining waveforms 201a, 201b, 201c, 201d and 201e in FIGS. 5, 6, 7, 8 and 9.
Figure 15:
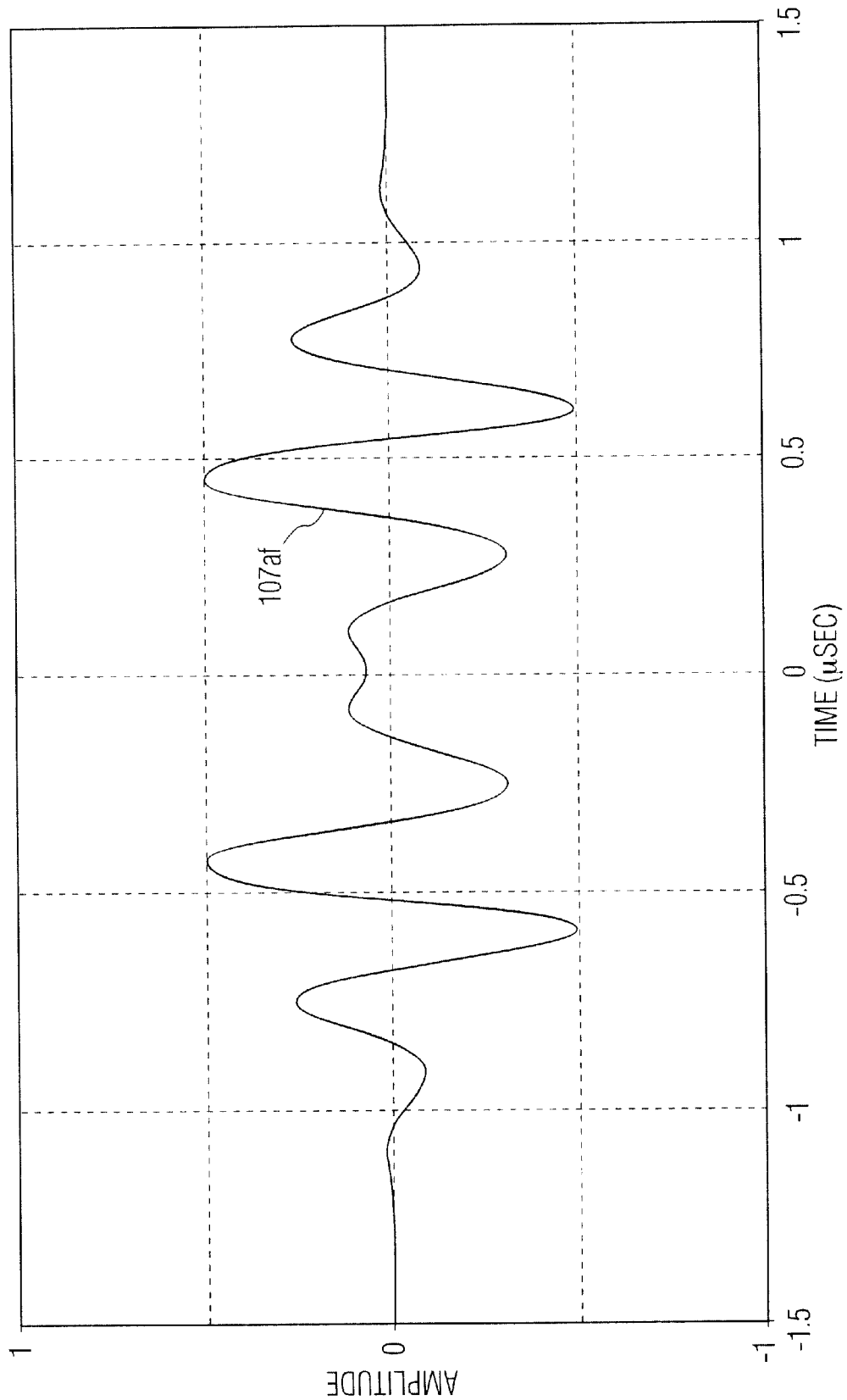
FIG. 15 discloses the shape of composite waveform 107af that would result by combining waveforms 201a, 201b, 201c, 201d, 201e and 201f in FIGS. 5, 6, 7, 8, 9 and 10.
Figure 16:
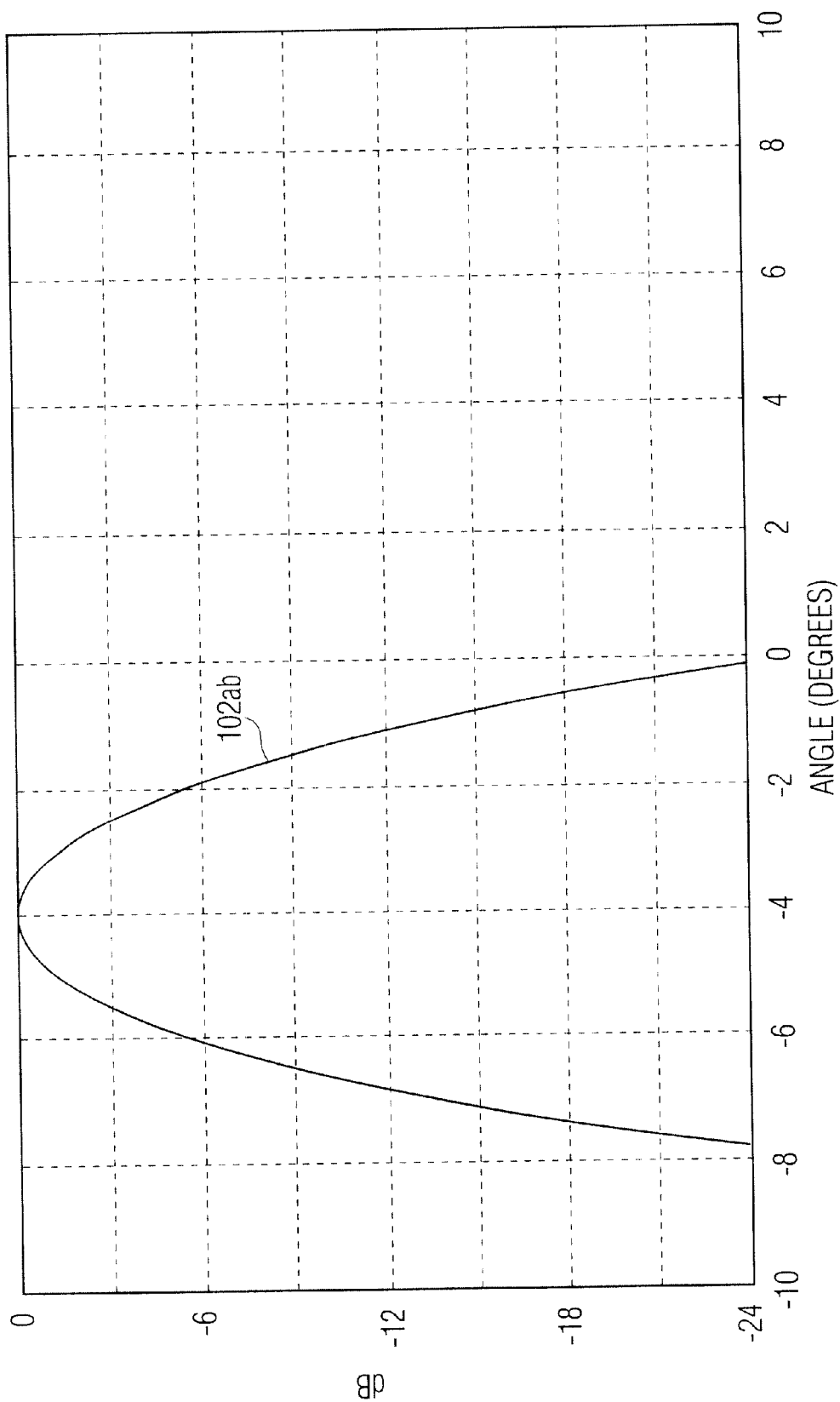
FIG. 16 discloses a spatial energy profile for a Fat TX beam formed from effectively combining two discrete transmit beams.
Figure 17:
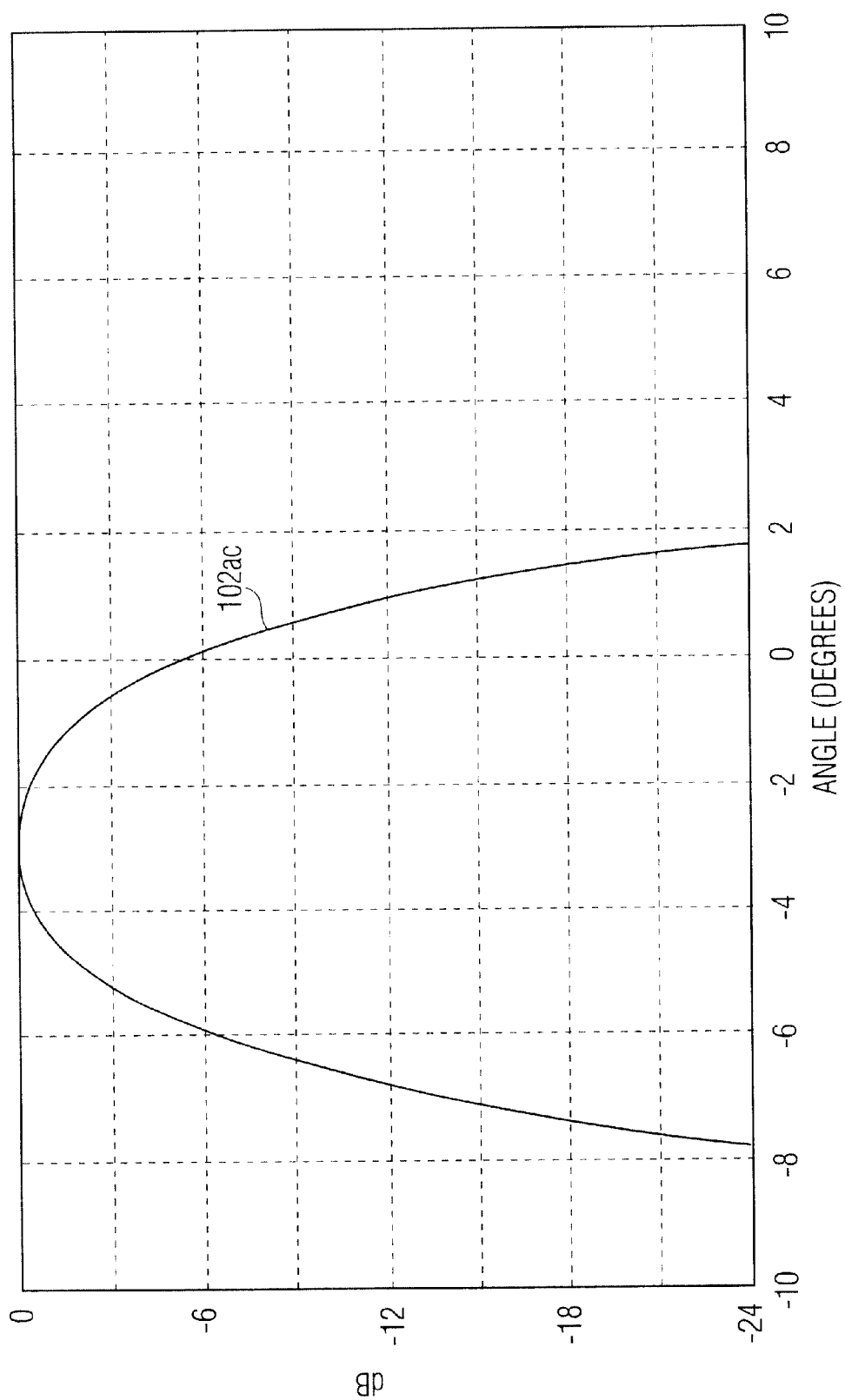
FIG. 17 discloses a spatial energy profile for a Fat TX beam formed from effectively combining three discrete transmit beams.
Figure 18:
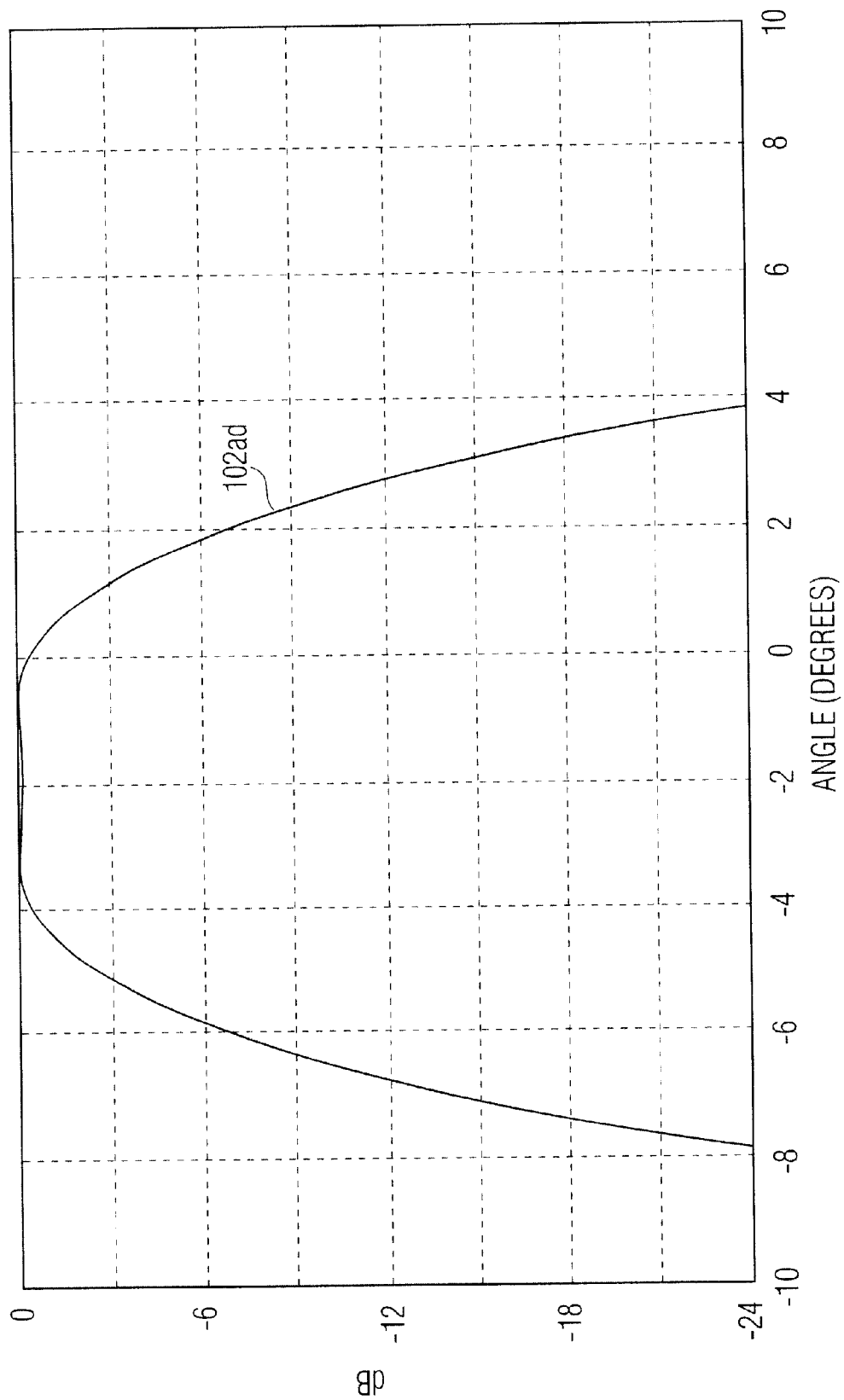
FIG. 18 discloses a spatial energy profile for a Fat TX beam formed from effectively combining four discrete transmit beams.
Figure 19:
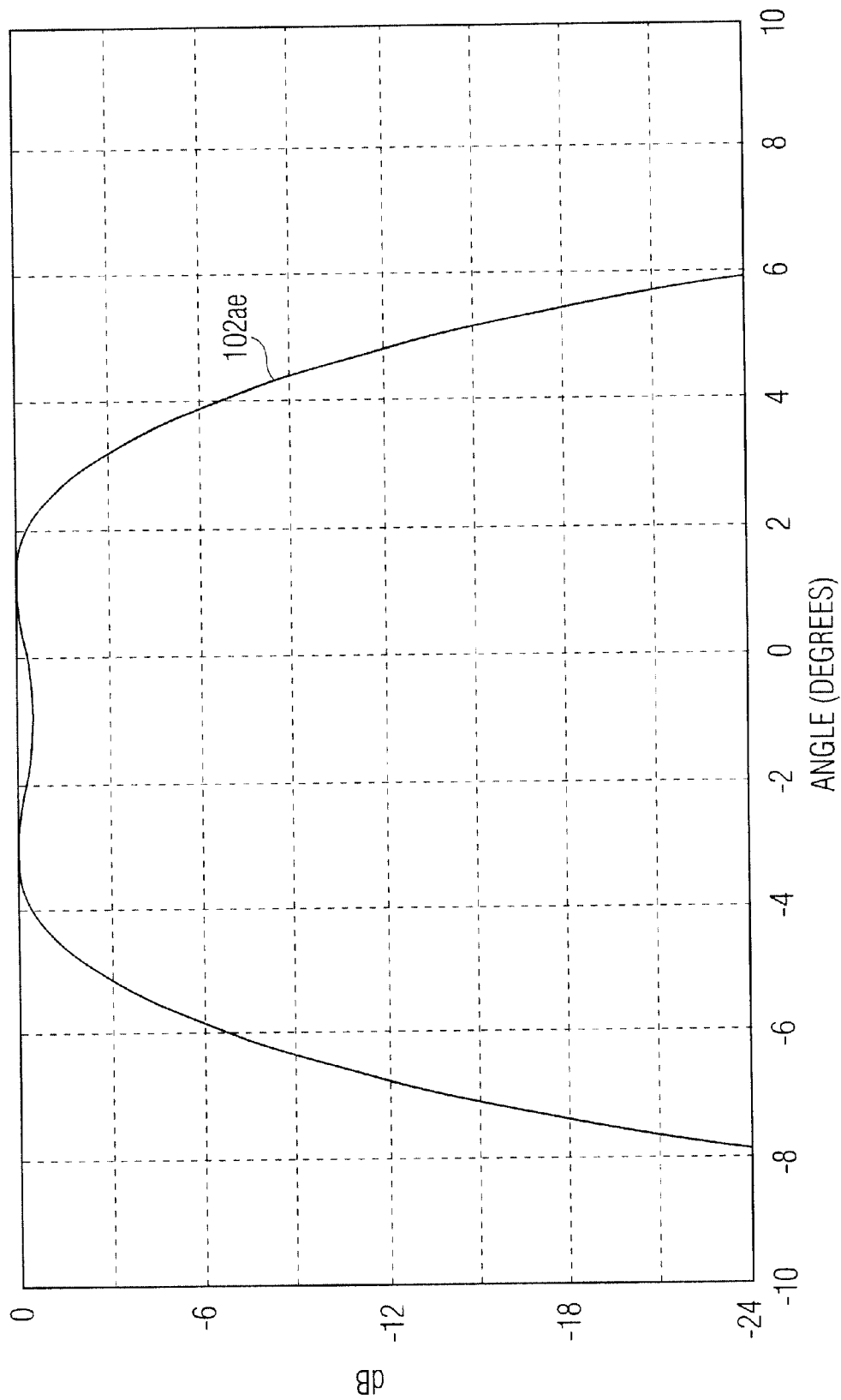
FIG. 19 discloses a spatial energy profile for a Fat TX beam formed from effectively combining five discrete transmit beams.
Figure 20:
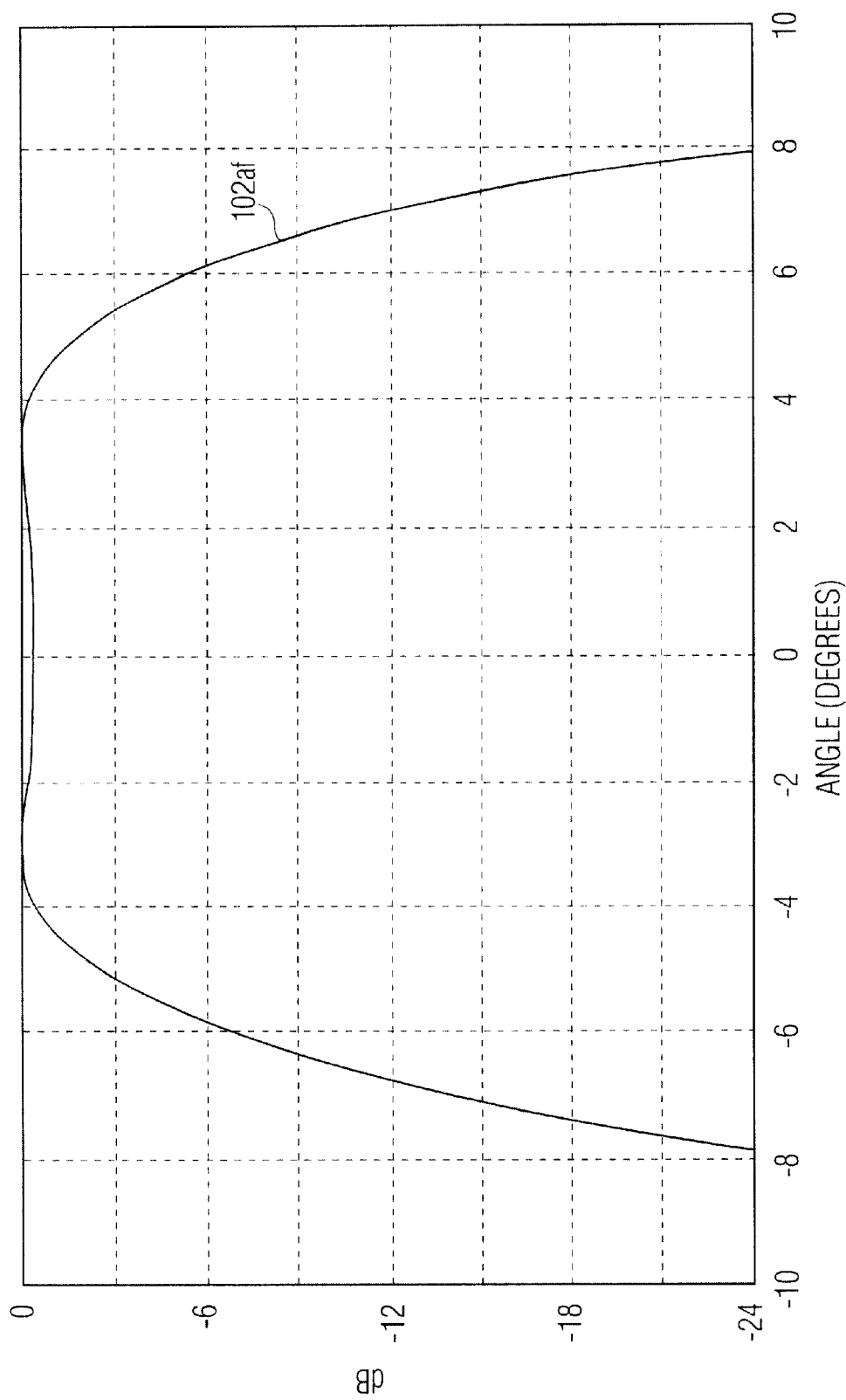
FIG. 20 discloses a spatial energy profile for a Fat TX beam formed from effectively combining six discrete transmit beams.

FIG. 11 discloses the shape of the waveform 107ab that would result by combining waveforms 201a and 201b in FIGS. 5 and 6. FIG. 12 discloses the shape of composite waveform 107ac that would result by combining waveforms 201a, 201b and 201c in FIGS. 5, 6 and 7. FIG. 13 discloses the shape of composite waveform 107ad that would result by combining waveforms 201a, 201b, 201c and 201d in FIGS. 5, 6, 7 and 8. FIG. 14 discloses the shape of composite waveform 107ae that would result by combining waveforms 201a, 201b, 201c, 201d and 201e in FIGS. 5, 6, 7, 8 and 9. Finally, FIG. 15 discloses the shape of composite waveform 107af that would result by combining waveforms 201a, 201b, 201c, 201d, 201e and 201f in FIGS. 5, 6, 7, 8, 9 and 10.

Each of these composite waveforms 107ab, 107ac, 107ad, 107ae and 107af can then be launched with similarly composited (but differently shaped) waveforms on the other channels of the transducer array from transducer elements 106 to form Fat TX beams corresponding to the scenarios of combining two, three, four, five and six discrete transmit beams, respectively.

The "shape" of a waveform is meant to signify the trace of the waveform's amplitude over time, or the geometric shape of the waveform, as seen in FIGS. 5–15. If composite waveforms 107 on two different channels have the same "shape" then, mathematically, their normalized cross-correlations achieve a value of 1, or unity, for some time lag (in particular, the time lag that compensates for the relative steering and focal delays applied to the respective channels). In practice, unity correlation is never fully achieved due to slight differences in values of the electronic components comprising each particular channel. In contrast, the shapes of the waveforms employed in the current invention are, by design, different between channels. The correlations of the inventive waveforms are less than unity for all time lags. This would be the case even if the channels could be fabricated using perfectly matched electronic components.

FIGS. 16–20 disclose profiles of the Fat TX beams formed from effectively combining two, three, four, five and six discrete transmit beams, respectively. As can be seen, the spatial energy profile 104 of the fat beams shown in FIGS. 16–20 becomes comparatively flatter. It will be appreciated by those skilled in the art that the number of combinable beams is limited only by the equipment that is being used to launch the beams. Any number of beams can be combined to form a Fat TX beam having a desired spatial energy profile that can be preferably flat, or to approximate some other desired shape.

Using this novel approach to beamforming, it is possible with the present invention to achieve a Fat TX beam with "skirts" that are comparatively steeper than a beam that can be produced by the beamformer described in U.S. Pat. No. 4,644,795 to Augustine. The Augustine beamformer is limited in its flexibility due to only varying the relative amplitudes of signals transmitted on each channel without changing the overall shape of the waveform from channel to channel. In contrast, by using the present invention, the overall shape of the waveform from channel to channel can be different. This added degree of flexibility permits a transmitted beam having a shape more closely resembling a "boxcar" to be realized.

Preferably, once the Fat TX beam is launched, some subset or superset of the transducer elements 106 will act as receivers to receive echoes from different tissue layers in the target. These signals are processed by receiver processor 111, and then sent to display/storage device 113.

EXAMPLE II

Figure 21:
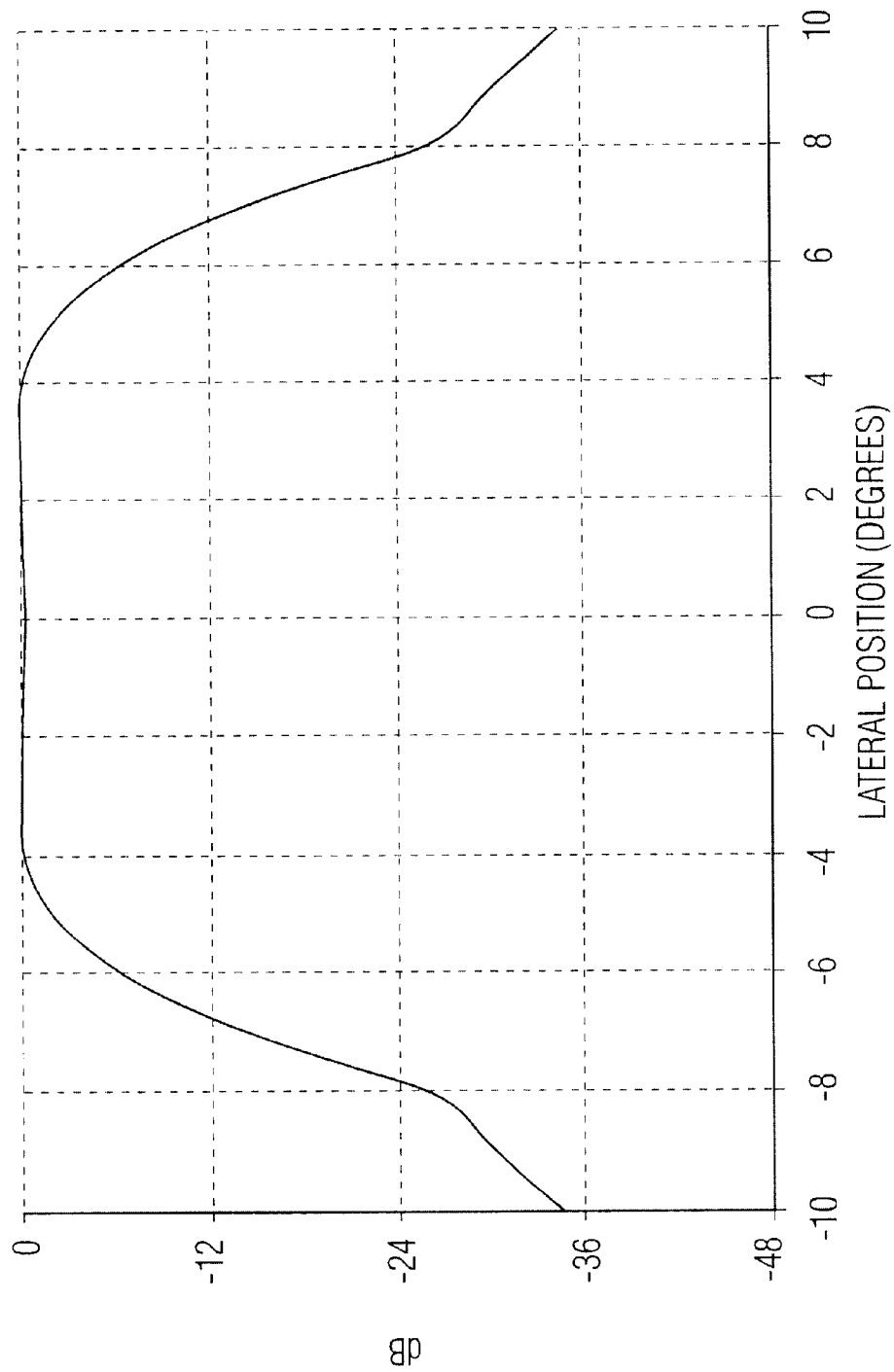
FIG. 21 discloses a Fat TX beam composed of four combined discrete transmit beams and two guard beams as spaced apart 2· corresponding to FIG. 4b.

FIG. 4a shows a situation wherein four transmit beams are aligned with four receive beams. As can be seen, each of the two "outermost" of the receive beams 203 in FIG. 4a only has a transmit beam on its inner side, but not on its respective outer side. In contrast, in FIG. 4b there is a transmit beam on the inner and outer sides of each of the receive beams. In accordance with the invention, the outer transmit beams 204 in FIG. 4b act as "guard beams". FIG. 21 shows a Fat TX beam composed of four combined discrete transmit beams and two guard beams spaced apart 2·. This corresponds to FIG. 4b. By using guard beams 204 (instead of using no guard beams as in FIG. 4a), the outermost of the receive beams 203 should each "see" roughly the same amount of signal as the inner receive beams. The end result will be an image with reduced jailbar artifacts.

Although FIG. 4 shows a one to one spatial correspondence between component transmit beams and receive beams, and indeed this is a convenient and efficacious way to design Fat TX beams, such a correspondence is not necessary. Line densities for the component transmit beams that are either greater than or less than the receive line densities are also possible and fall within the scope of this invention.

It will be appreciated by someone skilled in the art that is always possible to contemplate specifying or implementing a design in a "transform domain". In this invention the transform domain of the beam pattern is the complex aperture weighting function and the transform domain of the waveform on each element is its spectrum. Whereas the design approach presented above superimposes (broad bandwidth) waveforms corresponding to narrow, discrete, beam patterns, alternative approaches, operating in different domains, are also contemplated by the invention described herein.

For example, the final, desired, Fat TX beam pattern could first be transformed into a sequence of aperture domain amplitude weighting patterns. Each amplitude weighting pattern is associated with a different temporal frequency. Superposition of the sinusoidal (narrow bandwidth) waveforms associated with the different temporal frequencies results in synthesized waveforms that are substantially equivalent to those obtained using the beam superposition approach. Operation in any combination of the domains described above, and in any order, is also possible and within the scope of this invention.

Rather than use the direct synthesis approaches described above, it is also within the scope of the present invention to use optimization techniques to derive the waveforms required to create Fat TX beams. Generally, in the optimization approach, a desired Fat TX beam pattern, and a cost function that represents the difference between the desired pattern and the actual pattern, are defined. The waveforms on every channel are then treated as free variables in a procedure that iteratively minimizes the cost function. Because they are closed loop, optimization techniques have the potential to produce even better beam patterns than the direct synthesis approaches. However, they are also much more complex and computationally expensive. Since the direct synthesis approaches are much simpler and have been found to produce satisfactory results, they are generally preferred.

The methods and systems of the present invention, as described above and shown in the drawings, provide for an ultrasound diagnostic system capable of providing enhanced resolution resulting from an ability to collect a greater quantity of image data in a given amount of time. It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A system for performing ultrasonic Fat TX, Multiline RX imaging, the system comprising:
   a transmitter to launch an ultrasound beam toward a target, the beam having a predetermined spatial energy profile in at least one location in the target, the transmitter including a plurality of transducer elements, each transducer element capable of producing a selected waveform having a desired shape;
   a transmitter processor configured to control the shape of the waveform produced on each transducer element, wherein the spatial energy profile of the beam is controlled by controlling the shape of the waveform produced by each transducer element;
   a receiver to receive energy from the ultrasound beam directed toward the target from the transmitter; and
   a receiver processor configured to process the received energy to determine image data representative of the target.

2. The system of claim 1, wherein the spatial energy profile of the ultrasound beam is substantially flat at the location in the target.

3. The system of claim 2, wherein the receiver is formed of a plurality of transducer elements.

4. The system of claim 3, wherein the plurality of transducer elements forming the receiver include at least a portion of the plurality of transducer elements forming the transmitter.

5. The system of claim 2, wherein the received energy is received in the form of at least one received beam having an outer periphery and the transmitter is further configured to send ultrasound guard beams on the outer periphery of the at least one received beam.

6. The system of claim 4, wherein the shapes of the waveforms produced by first and second transducer elements are different.

7. The system of claim 1, wherein the final shape of the waveform launched from any transducer element is determined by combining at least two preselected waveforms.

8. A method for performing ultrasonic Fat TX, Multiline RX imaging comprising the steps of:
   selecting waveforms to transmit on a plurality of transducer elements toward a target, wherein each transducer element is capable of producing a selected waveform having a desired shape and said transducer elements comprise a transmitter;
   transmitting an ultrasound beam from the transmitter, wherein the beam has a predetermined spatial energy profile in at least one location in the target, wherein the spatial energy profile of the beam is controlled by controlling the shape of the waveform produced by each transducer element;
   receiving energy from the ultrasound beam directed toward the target from the transmitter; and processing the received energy to determine image data representative of the target.

9. The method of claim 8, wherein the spatial energy profile of the ultrasound beam is substantially flat at the location in the target.

10. The method of claim 9, wherein the energy received in the receiving step is received on a plurality of transducer elements.

11. The method of claim 10, wherein at least one transducer element is used to both launch and receive ultrasonic energy.

12. The method of claim 9, wherein energy is received in the form of at least one received beam having an outer periphery, the method further comprising the step of sending guard beams on the outer periphery of the at least one received beam.

13. The method of claim 8, wherein the final shape of the waveform launched from any transducer element is determined by combining at least two preselected waveforms.

14. A machine readable program containing instructions for controlling a system to perform ultrasonic Fat TX, Multiline RX imaging, the system having a transmitter, a transmitter processor, a receiver and a receiver processor, wherein the program comprises:
   means for controlling transmission of an ultrasound beam from a plurality of transducer elements toward a target, the beam having a predetermined spatial energy profile in at least one location in the target, each transducer element capable of producing a selected waveform having a desired shape, wherein the spatial energy profile of the beam is controlled by controlling the shape of the waveform produced by each transducer element.

15. The machine readable program of claim 14, wherein the spatial energy profile of the ultrasound beam is substantially flat at the location in the target.

16. The machine readable program of claim 15, further comprising means for processing energy received from the target to determine image data representative of the target.

17. The machine readable program of claim 16, further comprising means to both launch and receive ultrasonic energy on at least one transducer element.

18. The machine readable program of claim 15, further comprising means for receiving energy in the form of at least one received beam having an outer periphery and means to control the transmitter to send ultrasound guard beams on the outer periphery of the at least one received beam.

19. The machine readable program of claim 17, further comprising means to transmit the ultrasound beam and receive energy on transducer elements arranged in a substantially two-dimensional array.

20. The machine readable program of claim 14, wherein the final shape of the waveform launched from any transducer element is determined by combining at least two preselected waveforms.

* * * * *